United States Patent [19]

Ebrahimi

[11] Patent Number: 5,594,504
[45] Date of Patent: Jan. 14, 1997

[54] PREDICTIVE VIDEO CODING USING A MOTION VECTOR UPDATING ROUTINE

[75] Inventor: Touradj Ebrahimi, Vaud, Switzerland

[73] Assignee: Lucent Technologies Inc., Murray Hill, N.J.

[21] Appl. No.: 271,308

[22] Filed: Jul. 6, 1994

[51] Int. Cl.⁶ ............................................... H04N 7/24
[52] U.S. Cl. ............................................ 348/416; 348/699
[58] Field of Search ................................ 348/699, 416, 348/402, 420, 421, 390; 384/384

[56] References Cited

U.S. PATENT DOCUMENTS

| | | | |
|---|---|---|---|
| 4,661,849 | 4/1987 | Hinman | 358/136 |
| 4,796,087 | 1/1989 | Guichard et al. | 358/136 |
| 5,148,269 | 9/1992 | de Haan et al. | 358/105 |
| 5,337,086 | 8/1994 | Fujinami | 348/402 |
| 5,343,539 | 8/1994 | Chan | 382/56 |
| 5,351,095 | 9/1994 | Kerdranuat | 348/699 |
| 5,398,068 | 3/1995 | Liu et al. | 348/416 |
| 5,428,403 | 6/1995 | Andrew et al. | 348/699 |

*Primary Examiner*—Thai Q. Tran
*Assistant Examiner*—Bryan S. Tung

[57] ABSTRACT

An improved method and apparatus for prediction coding with motion estimation uses a hierarchical approach in which a motion vector updating routine is performed with respect to multiple levels of smaller and smaller regions of a frame. The motion vector updating routine updates the motion vector of a smaller region by assigning to it a best motion vector selected from among an initial motion vector assigned to the smaller region, motion vectors of neighboring regions, and a matched motion vector obtained by performing a block matching technique for the smaller region. The best motion vector for each region is selected according to a priority scheme and a predetermined threshold value. Adjacent regions having the same motion vector are then merged together, and a region shape representation routine is used to specify contour pixels that will allow the merged regions to be recovered by a decoder. A contour coding routine is then used to encode the contour pixels for transmission to the decoder.

24 Claims, 14 Drawing Sheets

PREDICTIVE VIDEO CODING USING A MOTION VECTOR UPDATING ROUTINE

FIELD OF THE INVENTION

The present invention relates generally to a method and apparatus for prediction coding utilizing information that is already present in a video receiver in order to describe a current frame with as little information as possible. More particularly, the present invention relates to an improved method and apparatus for prediction coding with motion estimation in which the frame-to-frame changes resulting from motion in an image depicted in a frame are detected and coded for transmission to a video receiver.

BACKGROUND OF THE INVENTION

Motion estimation and compensation techniques have received increasing attention for the transmission and storage of digital image sequences. For some digital video applications, high compression ratios have been achieved by using motion compensation methods to reduce inherent temporal pixel redundancies in image sequences. In such techniques, a motion field is estimated at an encoder. The motion field relates object locations in a previous frame of a sequence to their new locations in the current frame. Pixel intensities of the previous and current frames are used to compute the estimated motion field. This motion field estimate must then be reconstructed at a decoder without the benefit of intensities of the pixels in the current frame.

The principle of motion field estimation, which is well known in the prior art, may be better understood with respect to FIG. 1, which shows a preceding frame and a present frame. An object positioned at point A' in the preceding frame is moved to point B in the present frame. A two dimensional displacement or motion vector, v, is calculated from the point A' in the preceding frame to point B' in the preceding frame, where point B' corresponds to point B in the current frame. A signal I' (r+v) at point A' instead of a signal I' (r) at point B is used as a motion compensated prediction signal and is subtracted from a signal I(r) at point B so as to obtain a prediction error signal I(r)–I' (r+v) where r is the position vector which indicates a given position on the video screen. In motion compensated coding, the prediction error signal I(r)–I' (r+v) is smaller than the prediction error signal I(r)–I' (r). The former prediction error signal, therefore, can be used effectively to code an image signal with a moving object.

Block-based techniques represent one type of motion compensation method which computes motion vectors at an encoder and transmits them to a decoder where the motion field is constructed. In block-based video coding techniques, such as the one described in U.S. Pat. No. 4,307,420, a frame is divided into non-overlapping blocks or regions of N×N pixels. In order to limit the amount of information that must be transmitted to the decoder, block-based methods assume that blocks of pixels move with constant translational motion. A best match for each block is determined in the previously transmitted frame, where the criteria is typically the mean absolute difference between the intensities of the two blocks. The relative difference in position between the current block and the matched block in the previous frame is the motion vector. The intensity of the matched block is subtracted from the intensity of the current block in order to obtain the displaced frame difference (DFD). The collection of all the motion vectors for a particular frame forms a motion field. The motion field and the displaced frame differences are then transmitted from the encoder to the decoder, which predicts the new image based upon this transmitted information and the previous image in the sequence of images.

One inherent difficulty in block-matching techniques results from the assumption that motion is constant within any given block. When objects in a particular block move at different velocities, the motion vector obtained may correspond to only one, or possibly even none, of the objects in the block. If the size of the blocks is decreased, then the assumption becomes more valid. The overhead of computation and transmission of displacement or motion information, however, increases.

One method for improving motion estimation and compensation, proposed by M. T. Orchard in *"Predictive Motion-Field Segmentation For Image Sequence Coding,"* IEEE Transactions on Circuits and Systems For Video Technology, Vol. 3 (Feb. 1993), involves segmenting the motion field of frames in a sequence, and using the segmentation to predict the location of motion-field discontinuities in the current frame. Motion estimates for each segmented region are chosen from among the motion vectors of the nearest neighboring regions based upon the motion vector that minimizes the prediction error. A scheme is then presented for predicting the segmentation at the decoder computed from previously decoded frames.

A similar technique of motion estimation and segmentation is disclosed in Liu et al., *"A Simple Method To Segment Motion Field For Video Coding,"* SPIE Visual Communications and Image Processing, Vol. 1818, pp. 542–551 (1992). Motion vectors for blocks of sixteen by sixteen pixels are first determined by block matching, and each block is then divided into sixteen sub-blocks of four by four pixels. A motion vector is chosen for each sub-block from among the motion vectors of the larger block and neighboring blocks such that the prediction error is minimized.

SUMMARY OF THE INVENTION

The present invention discloses an improved method and apparatus for prediction coding with motion estimation, in which the frame-to-frame changes resulting from motion in an image depicted in a video frame are detected and coded for transmission to a video receiver. The motion estimation technique of the present invention uses a hierarchical approach in which a motion vector updating routine is performed with respect to multiple levels of smaller and smaller regions of a frame. The motion vector updating routine updates the motion vector of a smaller region by assigning to it a best motion vector selected from among an initial motion vector assigned to the smaller region, motion vectors of neighboring regions, and a matched motion vector obtained by performing a block matching technique for the smaller region. The best motion vector for each region is selected according to a priority scheme and a predetermined threshold value.

Other features and advantages of the present invention will be readily apparent by reference to the following detailed description and accompanying drawings.

BRIEF DESCRIPTION OF THE DRAWINGS

FIGS. 11A–11C show an exemplary frame during various stages of the contour coding routine.

DETAILED DESCRIPTION OF THE PRESENT INVENTION

Motion Field Estimation and Segmentation

Figure 1:
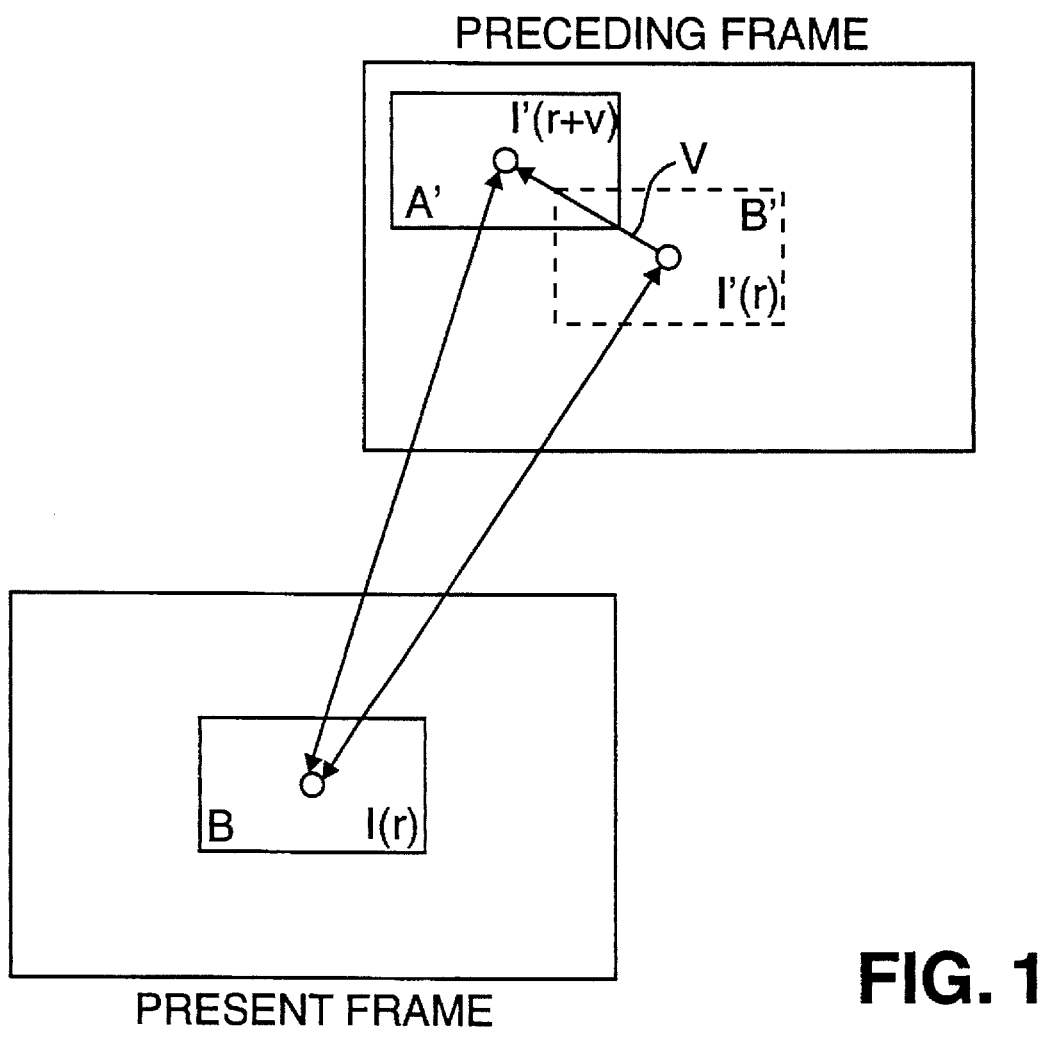
FIG. 1 shows the principle of frame-to-frame motion field estimation.
Figure 2:
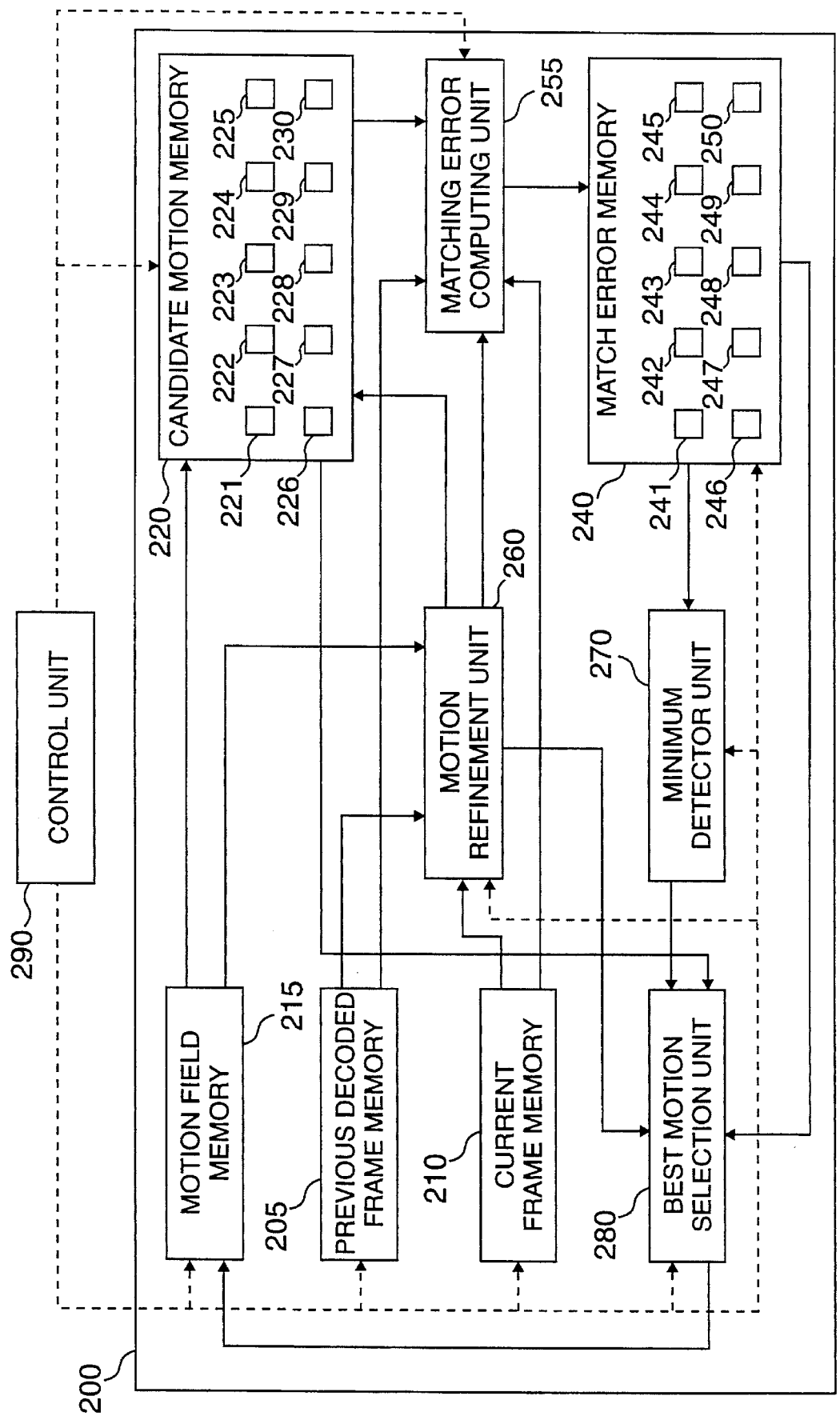
FIG. 2 is a block diagram of a motion estimation and segmentation unit according to the present invention.

FIG. 2 is a block diagram of a motion estimation and segmentation unit 200 for determining the motion vector of pixels or groups of pixels in a present frame with respect to pixels or groups of pixels in a preceding frame according to the present invention. The unit 200 has several read-write memory units 205, 210, 215, 220 and 240. The previous decoded frame memory unit 205 has sufficient memory for storing a monochrome intensity corresponding to each pixel in the preceding frame. Similarly, the current frame memory unit 210 has sufficient memory for storing a monochrome intensity corresponding to each pixel in the current frame. Each pixel in a frame is referenced by horizontal and vertical coordinates, (x,y). For example, the pixel in the upper-left corner of the frame would have the coordinates (1,1), and the pixel in the lower-right corner of the frame would have the coordinates (M, N) in a frame having a total of (M×N) pixels. The motion field memory unit 215 has sufficient memory for storing a calculated two-dimensional motion vector corresponding to each pixel in the current frame.

The candidate motion vector memory unit 220 stores the values of motion vectors which, according to the method of the present invention, are candidates for refining or updating the value of the motion vector corresponding to a particular region or block of pixels in the current frame. In particular, the memory unit 220 has a file 221 for storing the value of a motion vector initially assigned to a region whose motion vector is being updated. The memory unit 220 also has eight files 222–229 for storing motion vectors assigned to regions neighboring the region whose motion vector is being updated, as explained further below. The memory unit 220 is connected to the motion field memory unit 215 so that it can receive the value of the motion vector initially assigned to the region whose motion vector is being updated as well as the motion vectors of neighboring regions. Finally, the memory unit 220 has a file 230 for storing a motion vector calculated by a motion refinement unit 260.

The motion refinement unit 260 receives data from the previous decoded frame memory unit 205, the current frame memory unit 210 and the motion field memory unit 215. The motion refinement unit 260 may be any suitable device or system in the prior art that performs a motion estimation technique which attempts to improve the motion vector initially assigned to the region whose motion vector is being updated by minimizing the prediction or matching error as defined below. Such motion estimation techniques are well known in the art and include, for example, block matching methods and their implementations, such as the one described in U.S. Pat. No. 4,307,420. The output of the motion refinement unit 260 provides a matched motion vector which is a two dimensional motion vector relating a region in the current frame to a region in the previous frame.

The matching error memory unit 240 stores matching errors corresponding to each of the motion vectors stored in the memory unit 220. The matching errors are computed in a matching error computing unit 255 which may be implemented in hardware or software. In general, the matching error is an indication of the error in prediction which results from using the monochrome intensity $b(z-D, t-t')$ of the previous frame and a particular two dimensional motion vector, D, to predict the monochrome intensity $b(z,t)$ of the current frame, where z is the two dimensional vector of spatial position and t' is the time interval between the two frames. The matching error or prediction error may be defined as the summation over all positions within a region under consideration, $\Sigma N\ (b(z,t)-b(z-D, t-t'))$, where N is a distance metric such as the magnitude or the square function. Several simplifications for calculating matching errors have been suggested in the literature, some of which are summarized in section 5.2.3 g of the text *Digital Pictures Representation and Compression*, by A. N. Netravali and B. J. Haskell (Plenum Press 1991). The contents of this publication, and all other patents and publications referred to herein, are incorporated by reference into the present specification. The matching error computing unit 255 may be, for example, an electrical circuit, having an accumulator with a Manhattan adder, which computes a matching error according to the definition set forth above or one of the simplifications indicated above.

The matching error computing unit 255 receives input data from the previous frame memory unit 205, the current frame memory unit 210, and the candidate motion memory unit 220. In one embodiment, the matching error computing unit 255 also may receive a motion vector directly from the motion refinement unit 260. In an alternative embodiment, however, the motion vector calculated by the motion refinement unit 260 may be retrieved from the file 230 in the memory unit 220. Each matching error which is calculated for one of the motion vectors stored in the files 221–230 is stored in one of several corresponding files 241–250 in the matching error memory unit 240.

The motion estimation unit 200 also has a minimum detector unit 270 which determines the smallest value from among the matching errors stored in the files 241–250. The minimum detector unit 270 may be, for example, an electrical circuit comprising a comparator. An output of the minimum detector unit 270 is connected to a best motion vector selection unit 280. The best motion vector selection unit 280 determines which of the motion vectors stored in the memory unit 220 is the best motion vector for updating or refining the motion vector of the region or block which is being updated. The selection unit 280, which may be implemented as a general purposes computer with appropriate software or as an electronic circuit, makes the above determination based upon a predetermined threshold value and a priority scheme as explained further below.

The selection unit 280 also receives inputs from the matching error memory unit 240 and the candidate motion vector memory unit 220. In one embodiment, the selection unit 280 also receives a calculated motion vector from the motion refinement unit 260. In an alternative embodiment, however, the motion vector calculated by the motion refinement unit 260 is retrieved from the file 230 in the memory unit 220. The output of the selection unit 280 is a motion vector which is stored as the updated or refined motion vector in the motion field memory unit 215.

A control unit 290, which may be external to the motion estimation and segmentation unit 200, is connected to each of the other components in the unit 200. The control unit 290 may be, for example, a central processing unit (CPU) or a processing element which controls the other units in the unit 200 and their interaction.

Figure 3A:
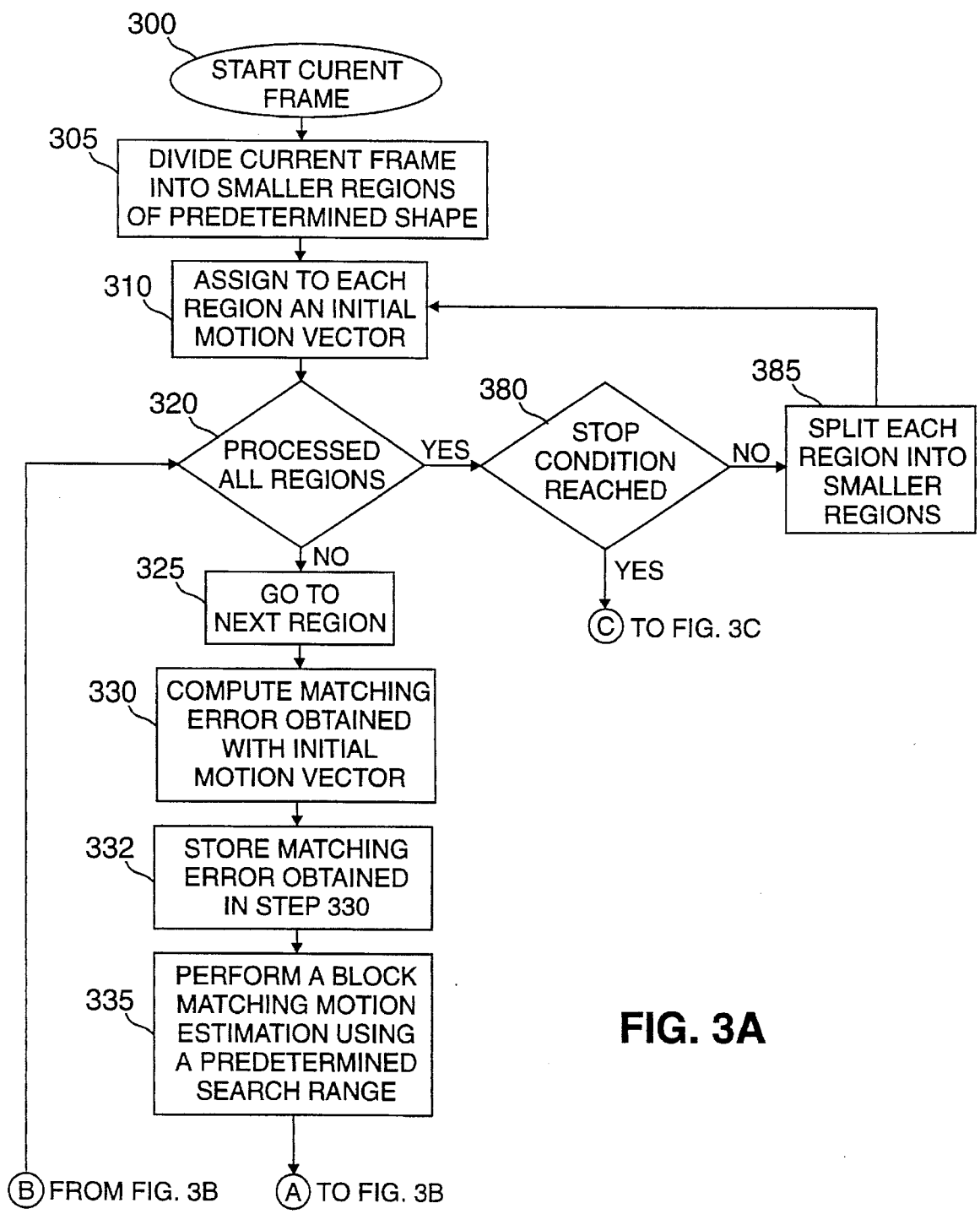
FIGS. 3A–3C are a flow chart showing the steps of motion estimation, segmentation and coding according to the method of the present invention.
Figure 3B:
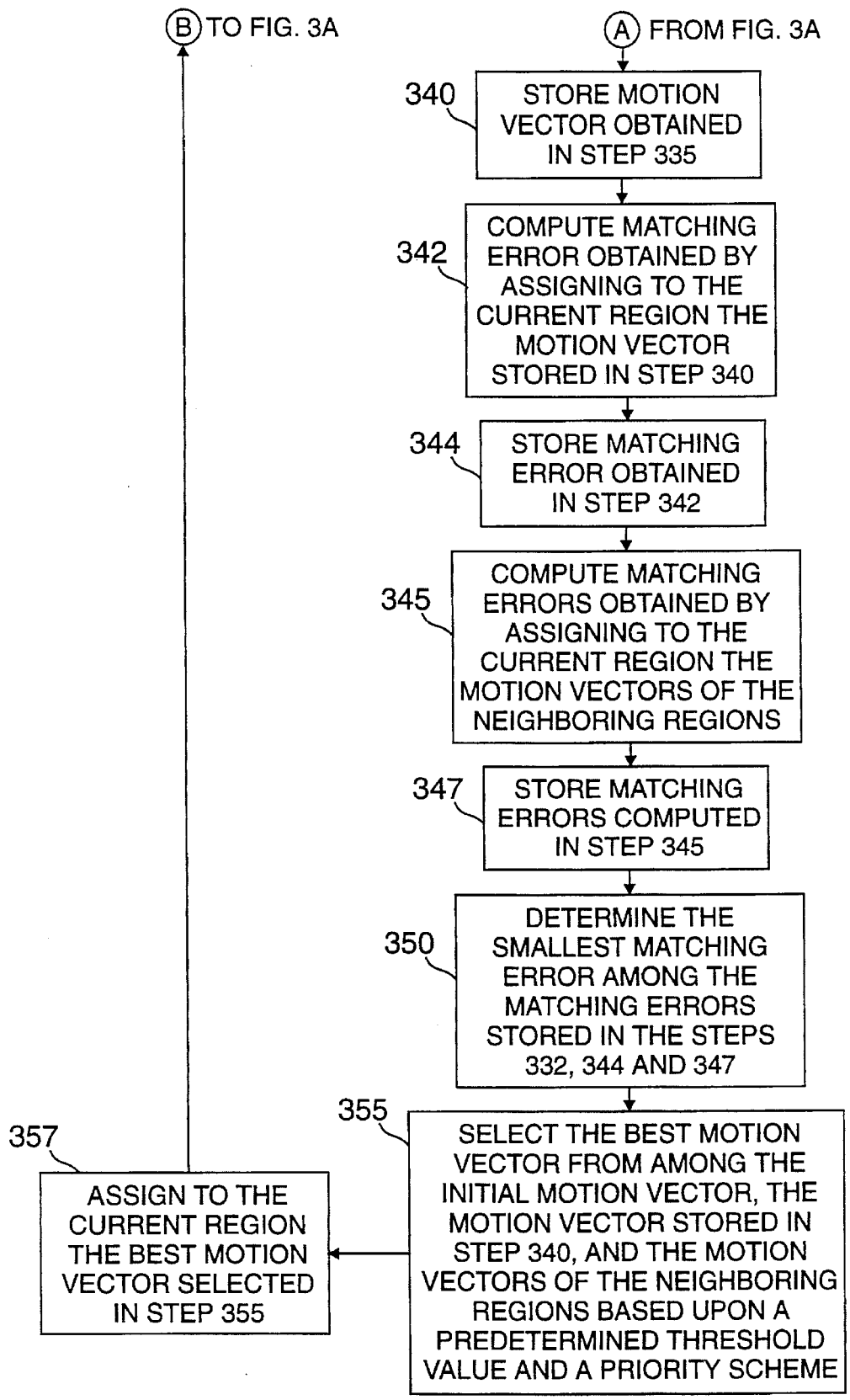
Figure 3C:
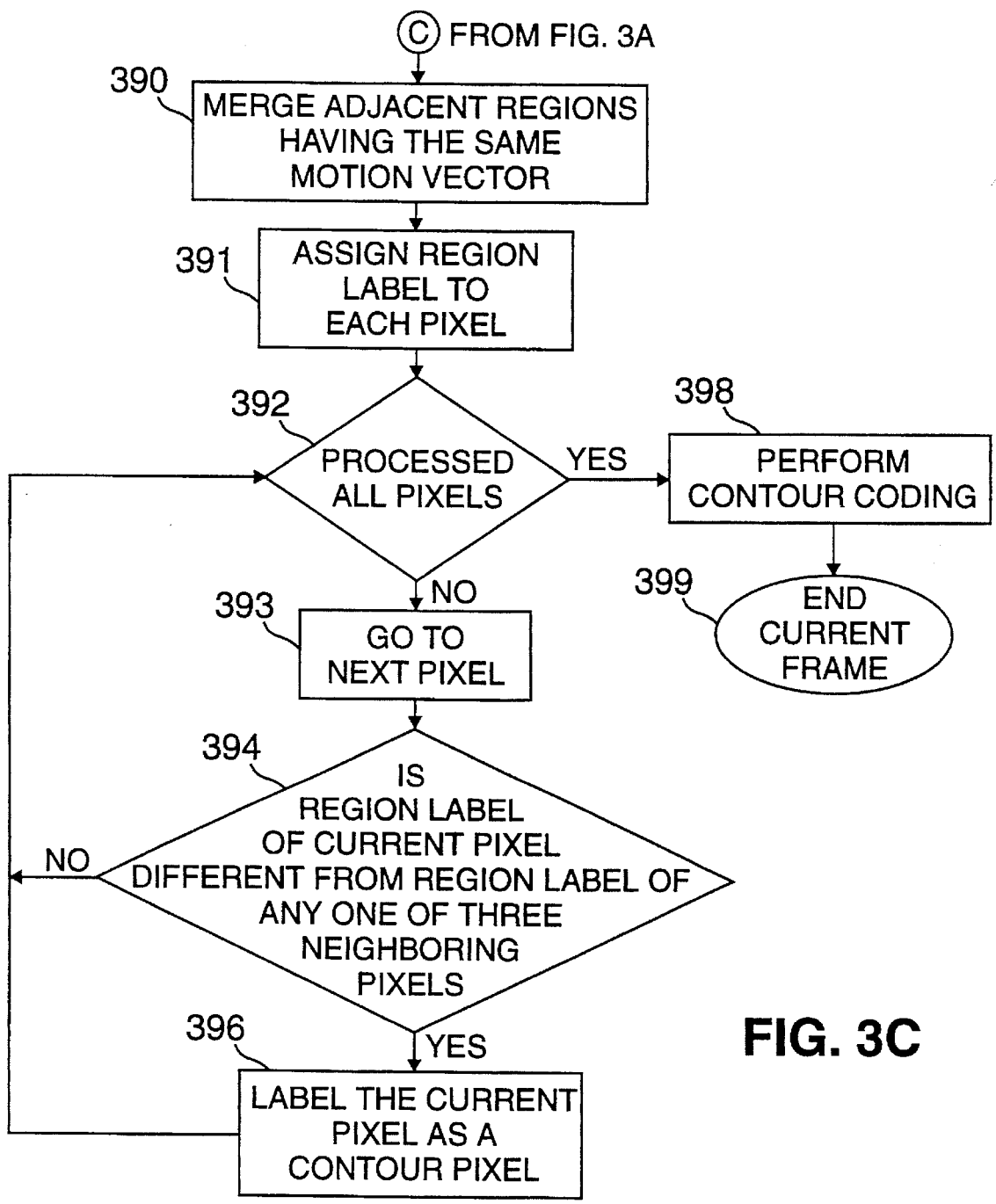

FIGS. 3A–3C are a flow chart showing the steps of motion estimation, segmentation and coding according to the present invention. The method of motion estimation and segmentation according to the present invention involves a hierarchical approach in which a motion vector updating routine is performed with respect to multiple levels of smaller and smaller regions of a frame. The method of processing a frame begins in step 300 at which point it is assumed that a preceding frame exists with reference to which a current frame can be predicted. In step 305, the current frame is segmented or divided into smaller regions of a predetermined shape. This segmentation represents a first segmentation level. While the predetermined shape may be arbitrary, triangular, or rectangular, the presently preferred predetermined shape is rectangular. Where the predetermined shape is rectangular, the frame may be divided into multiple regions of predetermined equal size. The predetermined size of the smaller regions depends upon several factors. The larger the size, the more likely it will be that a particular region contains several objects moving in different directions. The choice of the size of the regions in the step 305 also depends upon the size of the smallest moving object in the scene for which motion is detected. Regions of size sixteen by sixteen or thirty-two by thirty-two pixels appear to be suitable for images in Quarter Common Intermediate Format (QCIF). Larger sizes such as sixty-four by sixty-four pixels, however, may also be appropriate in certain applications. In step 310, each of the smaller regions that results from step 305 is assigned an initial motion vector.

Figure 4:
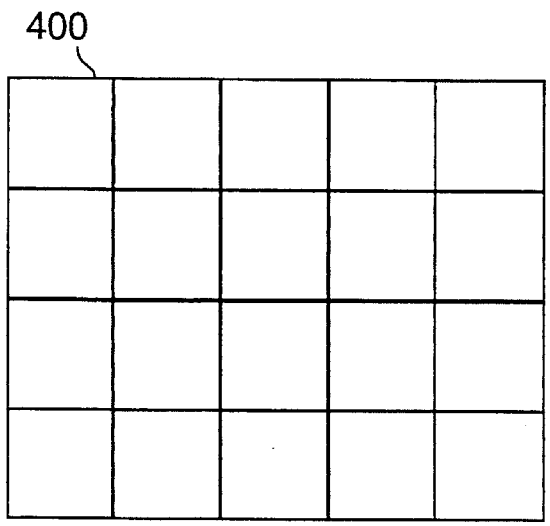
FIG. 4 shows an exemplary first level segmentation of a video frame.

In the preferred embodiment, the first time that step 310 is performed, the initial motion vector assigned to each of the smaller regions is the motion vector with value zero. An exemplary first level segmentation of a frame 400 is shown in FIG. 4. The frame 400 is divided into multiple regions, each of which is rectangular and has an initial motion vector of zero. The choice of an initial motion vector with value zero is made to lessen the likelihood that noise will be introduced.

The motion vector of each smaller region is updated according to a motion vector updating routine explained below. The next step depends upon whether all the regions in the current segmentation level have been processed according to the motion vector updating routine as indicated in step 320. If all the regions have not been processed, then, as indicated in step 325, the remaining regions are processed serially. The regions in the first segmentation level need not be processed in any particular sequence. The presently preferred sequence, however, begins with a corner region, such as the region corresponding to the upper-left of the current frame. The sequence then proceeds across the upper row to the region corresponding to the upper-right of the current frame. Each subsequent row of regions is processed from left to right until the region corresponding to the lower-right of the current frame has been processed.

The first step in the motion vector updating routine is shown in step 330 in which a matching error is computed for the current region under consideration by using the initial motion vector assigned to that region. The initial motion vector assigned to the current region may be temporarily stored in the file 221 of the memory unit 220 by retrieving it from the motion field memory unit 215. In step 332, the matching error obtained in step 330 is stored in one of the files 241–250 in the memory unit 240. Next, as shown in step 335, a motion estimation technique is performed with respect to the region under consideration. The motion estimation technique may be and known technique in the prior art or any similar technique which attempts to improve the motion vector initially assigned to the region whose motion vector is being updated by minimizing the prediction or matching error. Step 335 may be performed by the motion refinement unit 260.

One type of suitable motion estimation technique for use in step 335 involves block matching methods, which are well known in the art. Several block matching methods are described in section 5.2.3 g of the text by A. N. Netravali and B. J. Haskell, mentioned above. These methods include a full search, a 2D-logarithmic search, a three step search, and a modified conjugate direction search, any of which is suitable for performing the block matching motion estimation in the step 335. The block matching motion estimation technique is performed for the region under consideration and finds a best matched region in the preceding frame within a predetermined search range. For very low bit-rate applications, search ranges of between ±7 and ±15 pixels are suitable. The block matching technique performed in step 335 results in a matched motion vector which serves as one of the candidates for refining or updating the motion vector of the particular region under consideration. The matched motion vector is a two dimensional vector representing the distance between the location of the current region and the location of the best matched region in the preceding frame.

Next, as shown in step 340, the motion vector obtained from step 335 is stored in the file 230 of the memory unit 220. Also, as shown in step 342, a matching error is computed by assigning to the current region the motion vector obtained in step 335 and stored in the file 230. In step 344, the matching error computed in the step 342 is stored in the memory unit 240.

Figure 5:
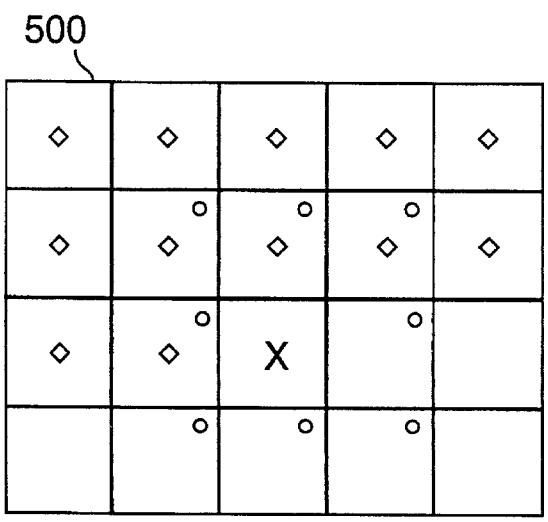
FIG. 5 shows an exemplary first level segmentation of a video frame indicating the region whose motion vector is currently being updated.

The next steps may be better understood with reference to FIG. 5 which shows a frame 500 which has already been divided into smaller regions. In FIG. 5, the presence of a diamond in a region indicates that the motion vector updating routine has already been performed with respect to that region. The region containing the 'x' is the region currently under consideration and whose motion vector is being updated. Finally, the regions containing a small circle are the regions neighboring the region under consideration. The regions containing a small circle may conveniently be referred to as neighboring regions. Most of the regions have eight neighboring regions. It will be noted, however, that the regions along the sides of the frame have only five neighboring regions, and the corner regions have only three neighboring regions.

In step 345, matching errors are computed by assigning to the current region the motion vectors of each of the neighboring regions. The motion vectors of the neighboring regions may be temporarily stored in the files 222–229 of the memory unit 220 by retrieving them from the motion field memory unit 215. With respect to the region under consideration in FIG. 5, it will be noted that the motion vectors of some neighboring regions have already been updated, whereas the motion vectors of other neighboring regions have not yet been updated. In any event, the current motion vector for each neighboring region is used in the step 345. Next, in step 347, the matching errors computed in the step 345 are stored in the memory unit 240.

It may be noted that up to ten matching errors have been computed with respect to the region under consideration. These matching errors include the matching error obtained by using the initial motion vector assigned to the current region, the matching error computed by assigning to the current region the matched motion vector obtained from the block matching technique, and up to eight matching errors obtained by assigning to the current region the motion vectors of the neighboring regions. In step 350, the minimum detector circuit 270, for example, determines the smallest matching error among the above enumerated matching errors. In step 355, a best motion vector for the current region is selected from among the motion vectors currently stored in the candidate motion vector memory unit 220 according to a predetermined threshold value and according to a priority scheme, as further explained below with reference to FIG. 6. The motion vectors currently stored in the memory unit 220 include the initial motion vector assigned to the current region, the matched motion vector obtained in the step 335, and up to eight motion vectors of the neighboring regions. Finally, in step 357, the best motion vector selected in the step 355 is assigned to the current region and stored in the motion field memory unit 215. The step 357 is the last step in the motion vector updating routine with respect to the current region. The process of the present method continues with step 320.

Selection of the Best Motion Vector

Figure 6:
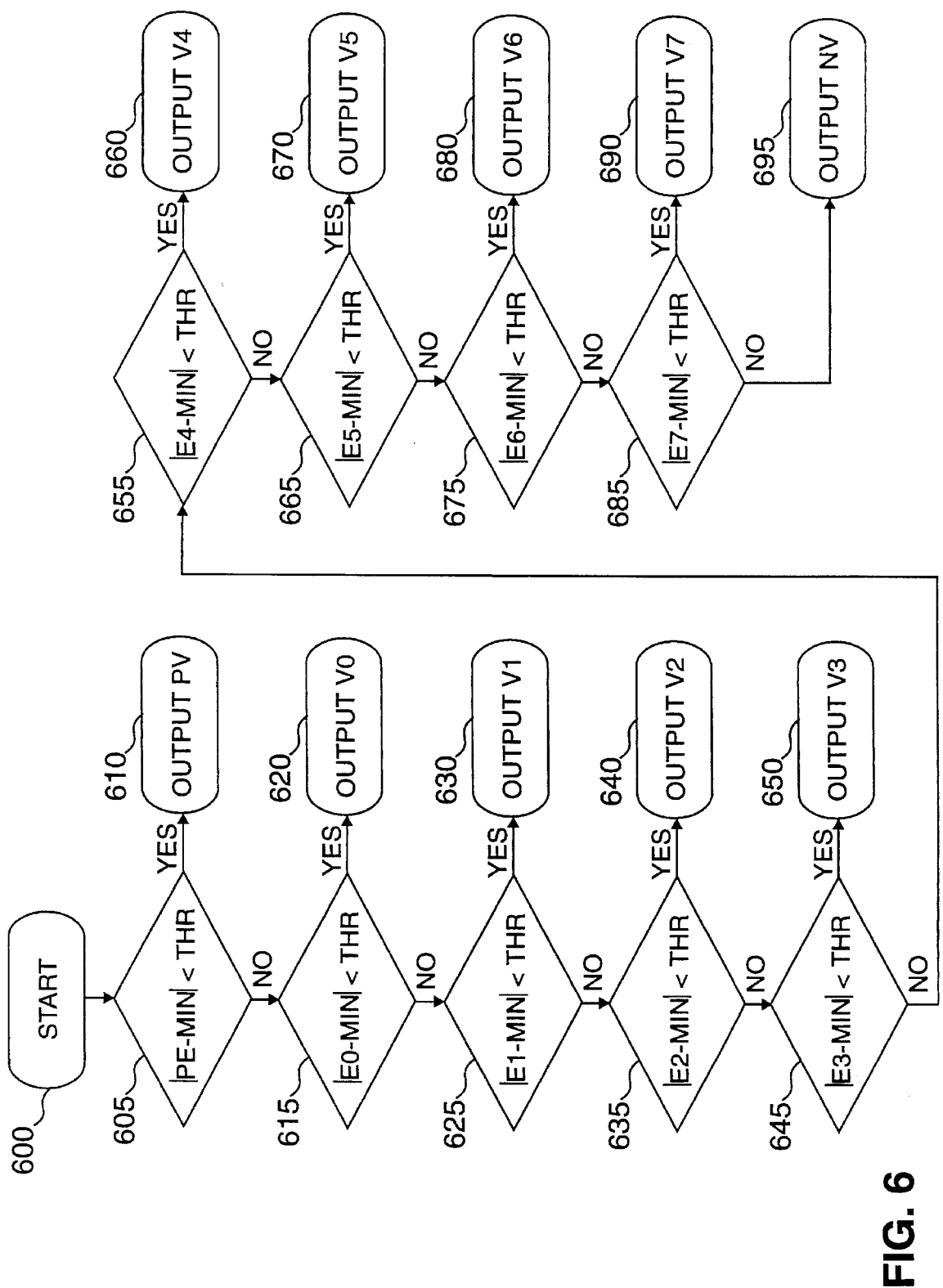
FIG. 6 is a flow chart showing the steps for selecting the best motion vector for the region under consideration according to the method of the present invention.

FIG. 6 shows the process by which the best motion vector is selected in step 355. The steps shown in FIG. 6 are performed, for example, by the best motion vector selection unit 280 in FIG. 2. A predetermined threshold value, which is chosen as a function of the size of the current region and a factor reflecting the amount of noise in the frame, is used to decide how the motion vector of the current region should be changed or updated. The basic idea is to substitute the matched motion vector or one of the motion vectors of the neighboring regions for the initial motion vector only if such a substitution yields a significant improvement in the matching error. The significance of an improvement is measured with respect to the predetermined threshold value, which contributes to the smoothness of the motion field and which reflects the amount of improvement obtained by assigning a particular motion vector as the best motion vector relative to a smallest matching error.

The process shown in FIG. 6 also indicates a preference for reassigning to the current region the initial motion vector assigned to the current region. This preference can be better understood by considering an image with a completely flat background and no motion. Any region in the flat area from the previous frame could be used to predict the current region during the block matching technique of the step 335. In real situations, however, there is always some noise added to the flat area. The noise causes random values to be assigned as the matched motion vector of each region. If no precaution is taken, then the flat areas will become noisy. The use of the threshold value combined with the initial assignment of motion vectors with value zero as well as the preference for the initial motion vector help prevent the introduction of noise. In addition, the process shown in FIG. 6 indicates a preference for the motion vectors of the neighboring regions over the matched motion vector in order to account for spatial consistency in the image.

Once the smallest matching error (MIN) is determined in step 350, selection of the best motion vector, as shown generally in step 355, starts in step 600 of FIG. 6. In step 605, it is determined whether the absolute value of the difference between the matching error (PE) obtained from the initial motion vector (PV) and the smallest matching error (MIN) is less than the predetermined threshold value (THR). If the absolute value in the step 605 is less than the threshold value, this determination indicates that substituting one of the neighboring motion vectors or the matched motion vector for the current value of the motion vector would not result in a significant improvement in the matching error. As shown in step 610, the initial motion vector (PV) is, therefore, selected as the best motion vector and serves as the output of the best motion vector selection unit 280. The routine then would proceed to step 357.

If, however, the absolute value in step 605 is not less than the threshold value, then the process continues with step 615. In step 615 and in each of steps 625, 635, 645, 655, 665, 675 and 685, it is determined whether the absolute value of the difference between one of the matching errors, obtained by assigning to the current region the motion vector of one of the neighboring regions, and the smallest matching error (MIN) is less than the predetermined threshold value (THR). In steps 615, 625, 635, 645, 655, 665, 675 and 685, the terms E0, E1, E2, E3, E4, E5, E6 and E7 refer respectively to a different one of the matching errors obtained by assigning to the current region a different one of the motion vectors of the neighboring regions. Also, in FIG. 6, the motion vectors corresponding to the matching errors E0, E1, E2, E3, E4, E5, E6 and E7 are, respectively, V0, V1, V2, V3, V4, V5, V6 and V7.

Although the process may proceed in any sequence of the neighboring regions and their corresponding motion vectors and matching errors, the preferred sequence begins with the neighboring region which is to the upper-left of the current region and proceeds in the same order in which the motion vector updating routine is performed as indicated above. Thus V0 would be the motion vector of the upper-left neighboring region, and E0 would be the matching error obtained by assigning V0 to the current region. Similarly, V7 would be the motion vector of the lower-right neighboring region, and E7 would be the matching error obtained by assigning V7 to the current region. If there are fewer than eight neighboring regions, then only the steps corresponding to the existing neighboring regions are performed. Alternatively, the matching error (PE) obtained from the initial motion vector (PV) may be used for the matching errors of the additional steps.

In each of the steps 615, 625, 635, 645, 655, 665, 675 and 685, if the absolute value of the difference between the matching error and the smallest matching error (MIN) is less than the predetermined threshold value (THR), then the motion vector corresponding to that matching error is selected as the best motion vector as shown in steps 610, 620, 630, 640, 650, 660, 670, 680 and 690, respectively. On the other hand, in each of the steps 615, 625, 635, 645, 655, 665 and 675, if the absolute value of the difference between the matching error and the smallest matching error (MIN) is not less than the predetermined threshold value (THR), then the process evaluates the next matching error in the sequence. Once a motion vector is selected as the best motion vector, the method continues with step 357.

If the process continues until the step 685 and the absolute value of the difference between the matching error E7 and the smallest matching error (MIN) is not less than the predetermined threshold value (THR), then this determination indicates that the matching error, obtained by assigning to the current region the matched motion vector (NV), is the smallest matching error (MIN) and that using the matched motion vector (NV) results in a significant improvement in the matching error. As shown in step 695, the matched motion vector (NV) is selected as the best motion vector and serves as the output of the best motion vector selection unit 280. The method then continues with step 357.

Processing Subsequent Segmentation Levels

Once all the regions in the first segmentation level are processed according to the motion vector updating routine, the method of the present invention proceeds, as shown in step 380, by evaluating whether a stop condition is reached or fulfilled. The stop condition may be, for example, a predetermined number of segmentation levels with respect to which the motion vector updating routine has been performed. Similarly, the stop condition may be a predetermined value of the total matching or prediction error for the current frame. Alternatively, the stop condition may be a lower limit upon the size of the regions with respect to which the motion vector updating routine is performed. In the preferred embodiment, the stop condition is reached when the size of the smallest regions is four by four pixels. Regions of four by four pixels appear to represent a good balance between the competing goals of minimizing the matching errors and sending as little side information as possible to a receiver for decoding. In any event, an absolute lower limit of two by two pixels is placed upon the size of the regions with respect to which the updating routine is performed. This lower limit is equivalent to the restriction that the regions that result from successive performances of the updating routine are at least as large as two by two pixels. The reason for choosing this absolute lower limit will become apparent with respect to the preferred method for representing the shape of merged regions, as further explained below.

Figure 7:
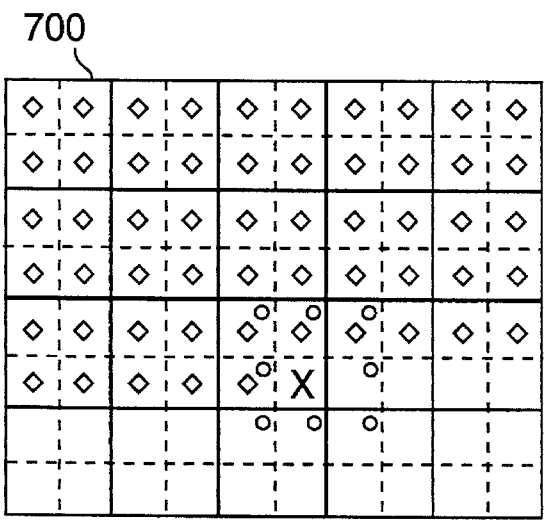
FIG. 7 shows an exemplary second level segmentation of a video frame.

If the stop condition has not been fulfilled, then the method proceeds, as shown in step 385, by dividing each of the regions from the previous segmentation level into even smaller regions of a predetermined shape and size. In general, larger regions, which are divided into the smaller regions, may be referred to as parent regions. As in step 305, each parent region may be divided into any predetermined shape. The predetermined shape of the regions in step 385 may be the same or different from the predetermined shape of the regions obtained by performing step 305. The preferred predetermined shape for use in step 385, however, also is rectangular. Each parent region, therefore, is divided into four smaller rectangular regions of equal size. FIG. 7 shows a second segmentation level of a frame 700 where the solid lines delineate the parent regions by performing step 305, and where the dotted lines delineate the smaller regions obtained by performing step 385.

As shown in the step 310, each of the smaller regions that was divided from a parent region is assigned an initial motion vector. The initial motion vector assigned to each smaller region in the second segmentation level and in subsequent segmentation levels is the motion vector of the parent region from which it was divided in step 385. This assignment of initial motion vectors contrasts with the assignment of initial motion vectors of value zero to each region in the first segmentation level when step 310 is performed for the first time.

Once initial motion vectors have been assigned to each region in the second segmentation level, the method of the present invention proceeds to perform the motion vector updating routine by performing the steps 320 through 357 with respect to each of the smaller regions in the second segmentation level. The result is that the motion vector for each of the regions in the second segmentation level is refined or updated. If the stop condition is still not reached when all the regions in the second segmentation level have been processed, then a third segmentation level is created by dividing each region in the second segmentation level into yet smaller regions as indicated in step 385. Each region in the third segmentation level is assigned an initial motion vector equal to the motion vector of its parent region from the second segmentation level, and the motion vector updating routine is again performed with respect to each of the regions in the third segmentation level. This process of segmenting regions, assigning to each resulting smaller region an initial motion vector equal to the motion vector of its parent region from the preceding segmentation level, and performing the motion vector updating routine with respect to each region in the most recent segmentation level continues until the stop condition is fulfilled as shown in the step 380. It should be clear that there may, therefore, be multiple segmentation levels in which the motion vectors are continually refined and updated.

The presently preferred sequence for performing the motion vector updating routine with respect to rectangular regions within the second and subsequent segmentation levels is similar to the presently preferred sequence of processing regions in the first segmentation level, as shown in FIG. 7. In FIG. 7, the presence of a diamond in a region indicates that the region has already been processed. The 'x' marks the next region whose motion vector is to be refined or updated. The presence of a circle in a region indicates the neighboring regions of the region whose motion vector is to updated next. It should be understood, however, that regions in the second and subsequent segmentation levels may be processed in any order according to the method of the present invention.

One feature of the motion estimation and segmentation technique described in detail above is that it seeks simultaneously to reduce the matching or prediction error and to increase the smoothness or spatial consistency of the motion field. Another feature of the motion estimation technique described above is that it seeks to reduce the amount of noise introduced into the motion field and is more robust to noisy scenes. Further features of the present invention are described in greater detail below with respect to the motion field coding.

Merging and Contour Coding of Regions

Once the motion vector updating routine has been performed with respect to all the regions in the current segmentation level and the stop condition is fulfilled, the motion vector for each pixel in the current frame is processed for transmission to a receiver (not shown). It is preferable, however, to minimize the amount of information that must actually be sent to the receiver. Several techniques are known for coding the motion field of an image in a video frame. A preferred method of encoding the motion field, which is particularly advantageous in connection with the motion estimation process of the current invention, is shown in FIG. 3C.

Figure 8:
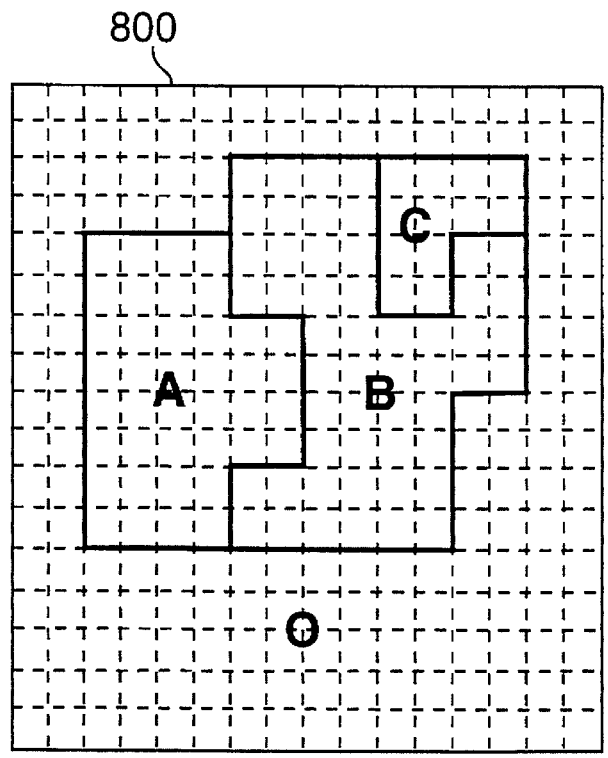
FIG. 8 shows an exemplary frame having merged regions.

As shown in step 390, a merging process is performed which merges adjacent regions having similar motion vectors to form a merged region. In the preferred embodiment, adjacent rectangular regions, which share a side and which have the same motion vector, are merged to form a merged region. FIG. 8 shows an exemplary frame 800 having merged regions A, B, C and O. In FIG. 8, the dotted lines delineate individual pixels, and the solid lines inside the frame 800 define the merged regions A, B, C and O.

The shape and location of each merged region within the current frame may be represented, for example, by its contour. The contours of the merged regions must be labeled or represented in a manner that provides sufficient information so that the shape and location of the merged regions can uniquely be reconstructed at the receiver. In the preferred embodiment, the contours are represented in a manner which minimizes the amount of information that must be sent to the receiver.

As shown in step 391, each pixel in the current frame is assigned a region label indicating to which merged region it belongs. Next, a region shape representation routine is performed for each of the pixels in the frame. The pixels are scanned line by line from left to right, starting with the pixel at the upper-left of the frame until all the pixels in the current frame are processed as shown in step 392. If the region shape representation routine has not been performed with respect to all the pixels, then the process continues with the next pixel, as shown in step 393.

As shown in step 394, the region label of the current pixel under consideration is compared to the region label of each pixel in a specified group of three neighboring pixels. The specified group of three neighboring pixels includes an adjacent pixel to the left of the pixel under consideration, an adjacent pixel above the pixel under consideration, and a pixel to the immediate upper-left of the pixel under consideration. It will be noted, however, that the upper-left pixel of the frame has no neighboring pixels as defined above. The upper-left pixel is, therefore, never labelled as a contour pixel in this routine. Pixels along the top and left sides of the frame have only one neighboring pixel as defined above. All other pixels have three neighboring pixels. If the region label of the current pixel is the same as each of the neighboring pixels in the specified group, then the process continues with step 392. As shown in step 396, however, each pixel which has a region label that differs from the region label of at least one of the specified group of three neighboring pixels is labelled as a contour pixel. The process then continues with step 392. The region shape representation routine, therefore, includes the steps 392–394 and 396.

Figure 9:
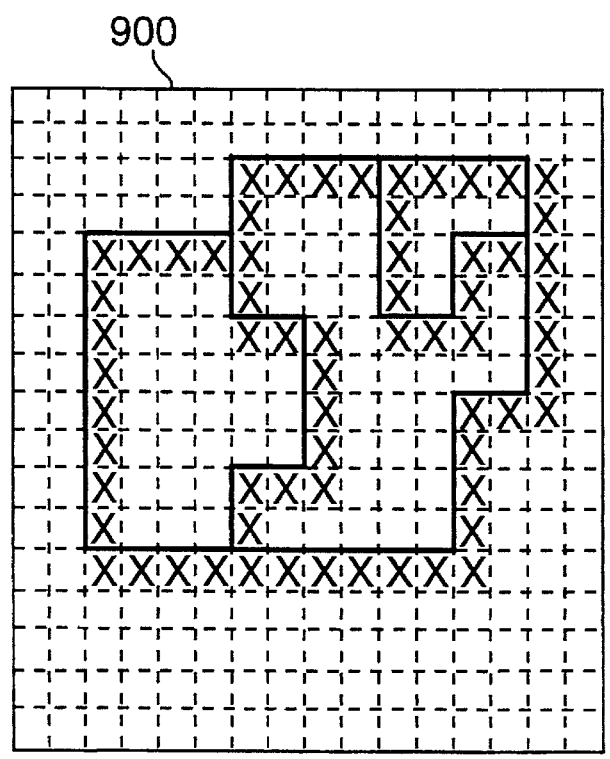
FIG. 9 shows the contour pixels that result from performing a region shape representation routine for all the pixels in the frame of FIG. 8.

FIG. 9 shows a frame 900 that is obtained by performing the region shape representation routine for each pixel in FIG. 8. The pixels in FIG. 9 that are marked with an 'x' represent the contour pixels. At a decoder at the receiver, the inverse of the region shape representation routine may be performed to recover regions labels corresponding to each pixel inside the merged regions. The region label assigned to the contour pixels at the decoder is the same as the label assigned to the right, lower-right or lower neighboring non-contour pixels. The region label corresponding to the other pixels may be recovered by any known filling algorithm. Such filling algorithms are described more fully, for example, in *Computer Graphics: Principles and Practice*, edited by J. Foley, A. Van Dam, S. Feiner, and J. Hughes (Addison-Wesley Publishing Co. 1987) and in D. H. Ballard and C. M. Brown, *Computer Vision* (Prentice Hall, Inc. 1982). This recovery technique assumes that any block of two by two pixels contains at most three contour pixels which is equivalent to the assumption that the smallest segmented region that is obtained by performing step 385 is two by two pixels.

The contour pixels that uniquely define the merged regions then may be encoded as shown in step 398. The most popular technique for coding contour pixels is known as chain coding, which consists of coding the position of a pixel relative to the position of its neighboring pixels. Chain coding is more fully described in H. Freeman, "On the Encoding of Arbitrary Geometric Configurations," *IRE Trans. on Elec. Comp.*, EC-10, pp. 260–268 (1961) (hereinafter "Freeman chain coding"), which is incorporated by reference herein. This chain coding technique as well as known variations of this technique are suitable for use in the step 398. Once the step 398 of contour coding is performed, motion estimation and encoding of the motion field for the current frame is complete, as shown in step 399.

Figure 10:
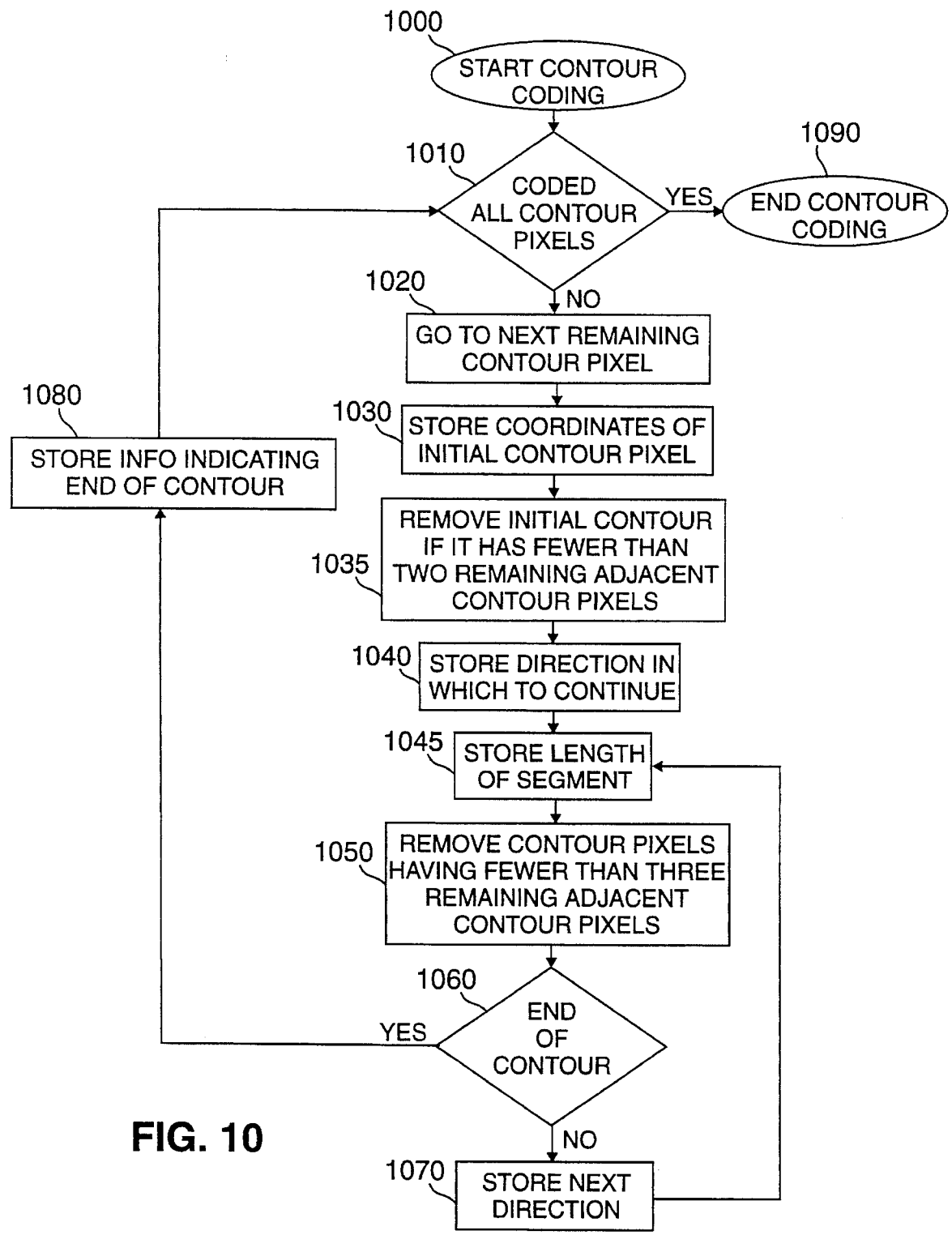
FIG. 10 is a flow chart showing the steps of a contour coding routine according to the present invention.

A preferred technique of contour coding, which is particularly advantageous in conjunction with the motion estimation technique of the present invention, is shown in FIG. 10. The contour coding routine of FIG. 10, which starts in step 1000, is a variation of the Freeman chain coding technique. Each pixel is scanned in sequence, for example, from upper-left to lower-right until all the contour pixels have been encoded, as shown in step 1010. If all the contour pixels have not yet been encoded, then the process continues with the next remaining contour pixel as shown in step 1020.

As in other chain coding techniques, the basic idea of the contour coding routine shown in FIG. 10 is to connect straight segments of a contour, by specifying how far the contour continues in the specified direction before changing direction and by specifying the direction in which the contour continues or whether an endpoint has been reached.

Figure 11A:
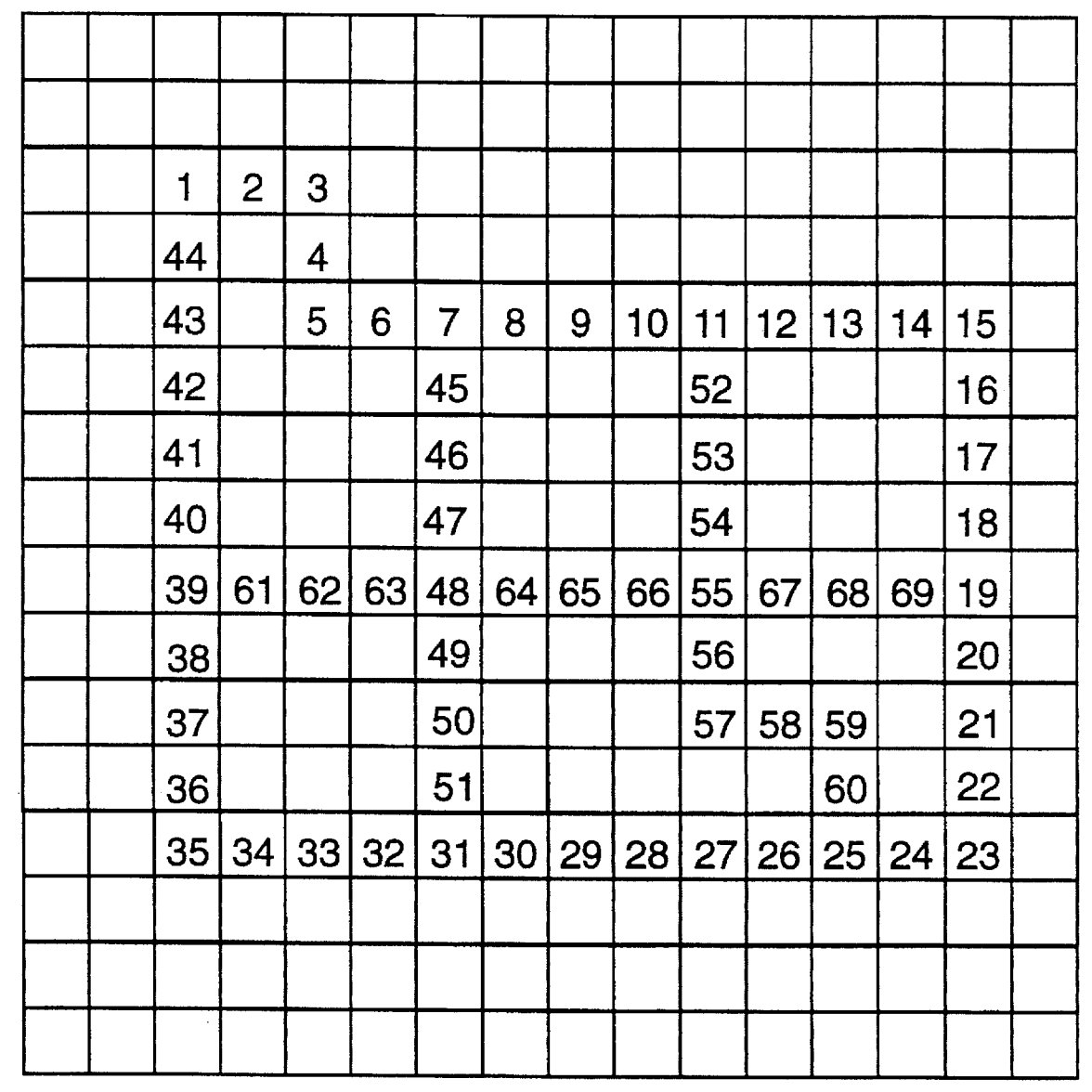
Figure 11B:
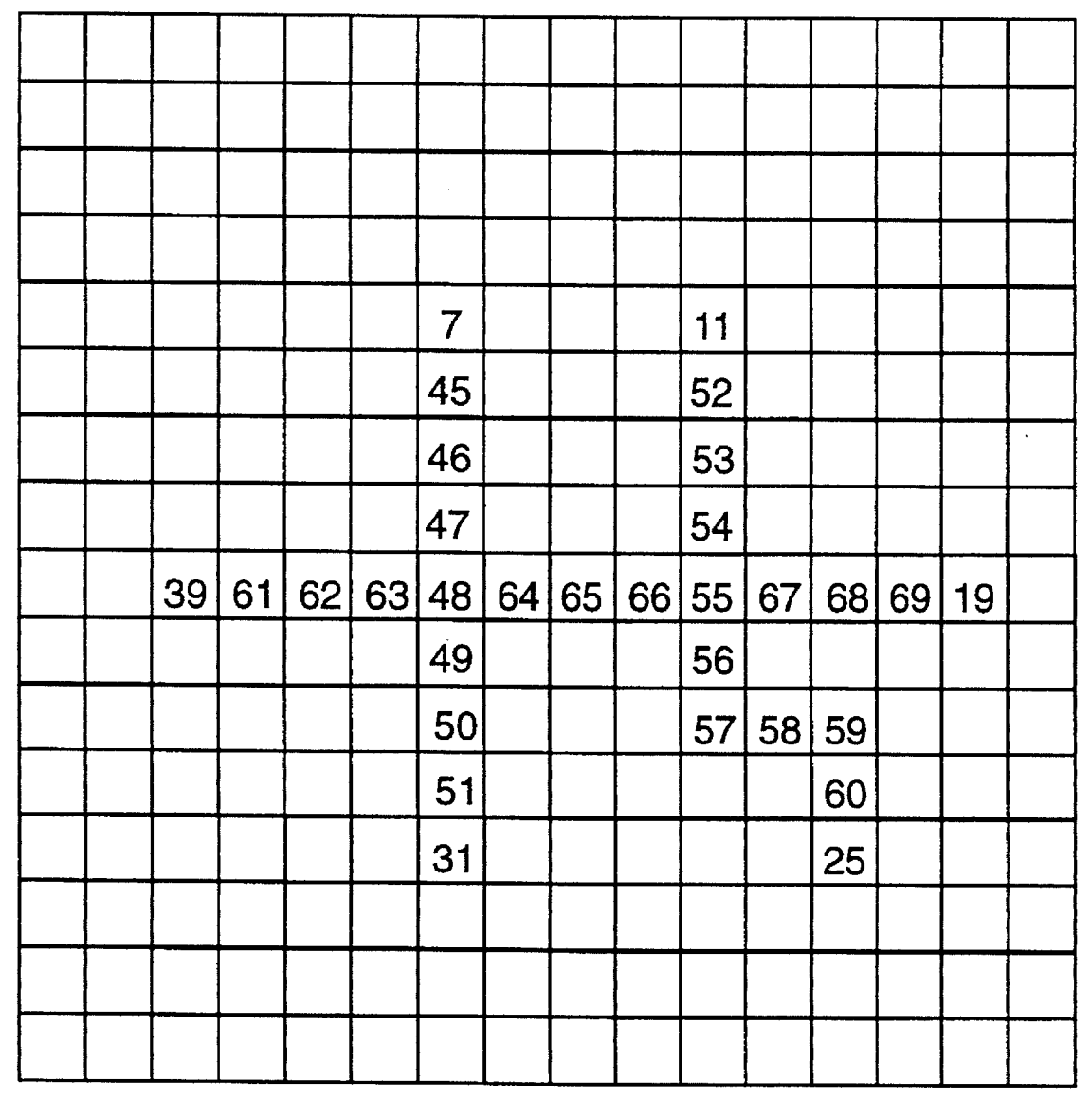
Figure 11C:
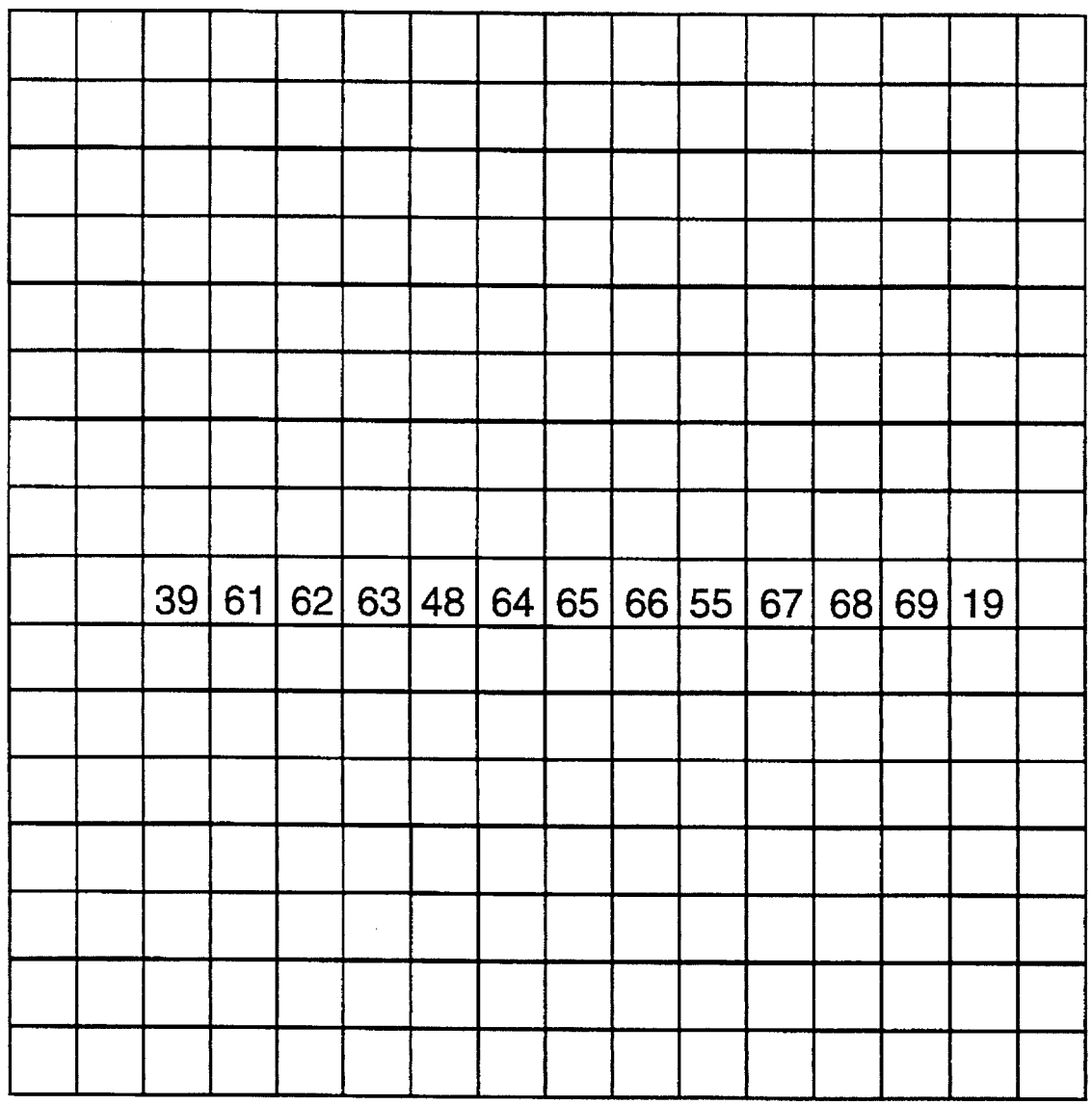

The following steps may be better understood in conjunction with FIGS. 11A–11C which show an exemplary frame during various stages of the contour coding routine. In FIGS. 11A–11C, the solid lines delineate individual pixels, and the numbered pixels represent the contour pixels. As shown in step 1030, the coordinates (x, y) of an initial contour pixel, such as the contour pixel 1, are stored in memory. In step 1035, the initial contour pixel is removed from consideration in subsequent steps of the contour coding routine if it has fewer than two remaining adjacent contour pixels. Next, in step 1040, the direction in which a segment of adjacent contour pixels continues is stored in memory. When a decision must be made regarding the direction in which coding of a particular segment should continue, the following preferred order may be used: right, down, left or up. A different order, however, may be used consistently with the present invention. Once a direction is specified, the contour continues in that direction so long as the next pixel is a contour pixel which has not been coded and removed, as explained below. As shown in step 1045, the length of the initial segment is then stored by specifying the number of pixels for which the contour continues in the specified direction. Laemmel coding conveniently may be used to code the variable length of the segments. Any other suitable run-length code, however, also may be used to code the variable length of the segments.

Next, as shown in step 1050, each contour pixel that has been encoded and that has fewer than three remaining adjacent contour pixels is removed from consideration in subsequent steps of the contour coding routine. In other words, those contour pixels which represent pixels where two contours intersect are not yet removed from consideration in the next loop of the contour coding routine, even though they already have been encoded once.

A particular contour ends either when it returns to its starting point or when there are no more adjacent contour pixels to be encoded. If a particular contour has not ended, as shown in step 1060, then the next direction in which the contour continues is stored in memory, as shown in step 1070. The direction specified in step 1070 is limited to two choices with respect to the previous direction. The processing continues with step 1045. The steps 1050–1070 are repeated until the contour ends. The fact that a pixel represents the last pixel of a particular contour may be encoded by storing additional information as shown in step 1080. For example, the last pixel may be specified by storing the immediately previous direction as the next direction code. Preferably, however, the last pixel is specified by storing a segment length of zero.

With reference to FIG. 11A, the first contour encoded by the contour coding routine shown in FIG. 10 includes the pixels 1–44 This first contour is encoded by storing the following information: the absolute coordinates of pixel 1, the direction "right," and a length of two; the direction "down" and a length of two; the direction "right" and a length of ten; the direction "down" and a length of eight; the direction "left" and a length of twelve; the direction "up" and a length of ten. The last pixel may be indicated by storing the direction "up" as the next direction or by storing a segment length of zero. FIG. 11B shows the contour pixels which remain and still must be encoded after performing a first loop of the contour coding routine with respect to the pixels in FIG. 11A. Note that the initial contour pixel 1 is not removed from consideration until after it is encoded a second time by storing the direction "up" and the length of ten.

The reason for removing only those contour pixels that have fewer than three remaining adjacent contour pixels becomes apparent, as explained more fully below, when a fourth loop of the contour coding routine is performed with respect to the pixels shown in FIG. 11A. A second performance of the loop encodes the contour pixels 7, 45–51, and 31 and removes the pixels 7, 45–47, 49–51, and 31 from consideration. A third performance of the loop encodes the contour pixels 11, 52–60, and 25, and removes the pixels 11, 52–54, 56–60, and 25 from consideration.

FIG. 11C shows the contour pixels which remain and still must be encoded after performing three loops of the contour coding routine with respect to the pixels in FIG. 11A. The remaining contour pixels 39, 61–63, 48, 64–66, 55, 67–69 and 19 may be encoded by performing one final loop of the contour coding routine. In contrast, if all the contour pixels that were encoded in any given loop were removed from consideration in subsequent loops of the contour coding routine, then at least six loops of the Freeman chain coding technique would be required to encode all the contour pixels in FIG. 11A. The amount of information that must be sent to the receiver increases as the number of loops increases because the coordinates of the initial contour pixel in each loop are stored for transmission as indicated in step 1030. Storing and transmitting the coordinates, however, is costly in terms of the amount of information that must be sent. The contour coding described above, therefore, improves the efficiency of the coding process.

A further improvement may be made to the coding process by normalizing the coordinates of the initial contour pixels as well as the length of the segments of the contours based upon the size of smallest regions that resulted from performance of the motion estimation technique described above. For example, if the smallest regions have a size of two by two pixels, then dividing by two the values of the coordinates and the segment lengths prior to encoding will further improve the efficiency of the coding process. Once all the contour pixels have been encoded, the contour coding routine ends, as shown in step 1090.

Finally, the encoded information, including the contour of each merged region and the motion vector associated with each merged region is sent to a decoder in the video receiver where it is used together with the previous frame information to predict the image in the current frame. The motion vectors may be encoded in binary code prior to sending them to the decoder.

It should be noted, that as with other motion estimation techniques, the motion estimation technique described above will not necessarily account for the appearance of previously covered portions of an image or the disappearance of previously uncovered portions of an image. Nevertheless, a signal may be provided to the decoder alerting it to the fact that the motion estimation technique is considered a failure with respect to a particular region or regions. For example, just prior to the merging step 390, the matching error of each region may be computed. If the computed matching error for any region or regions exceeds a particular threshold value, then the region or regions are assigned a special label indicating that the motion estimation is considered a failure for those regions. During the merging step 390, adjacent regions which are assigned the special label may be merged in the same manner as other regions are merged. The region shape representation routine and the contour coding routine then may be applied in the same manner as described above.

Figure 12:
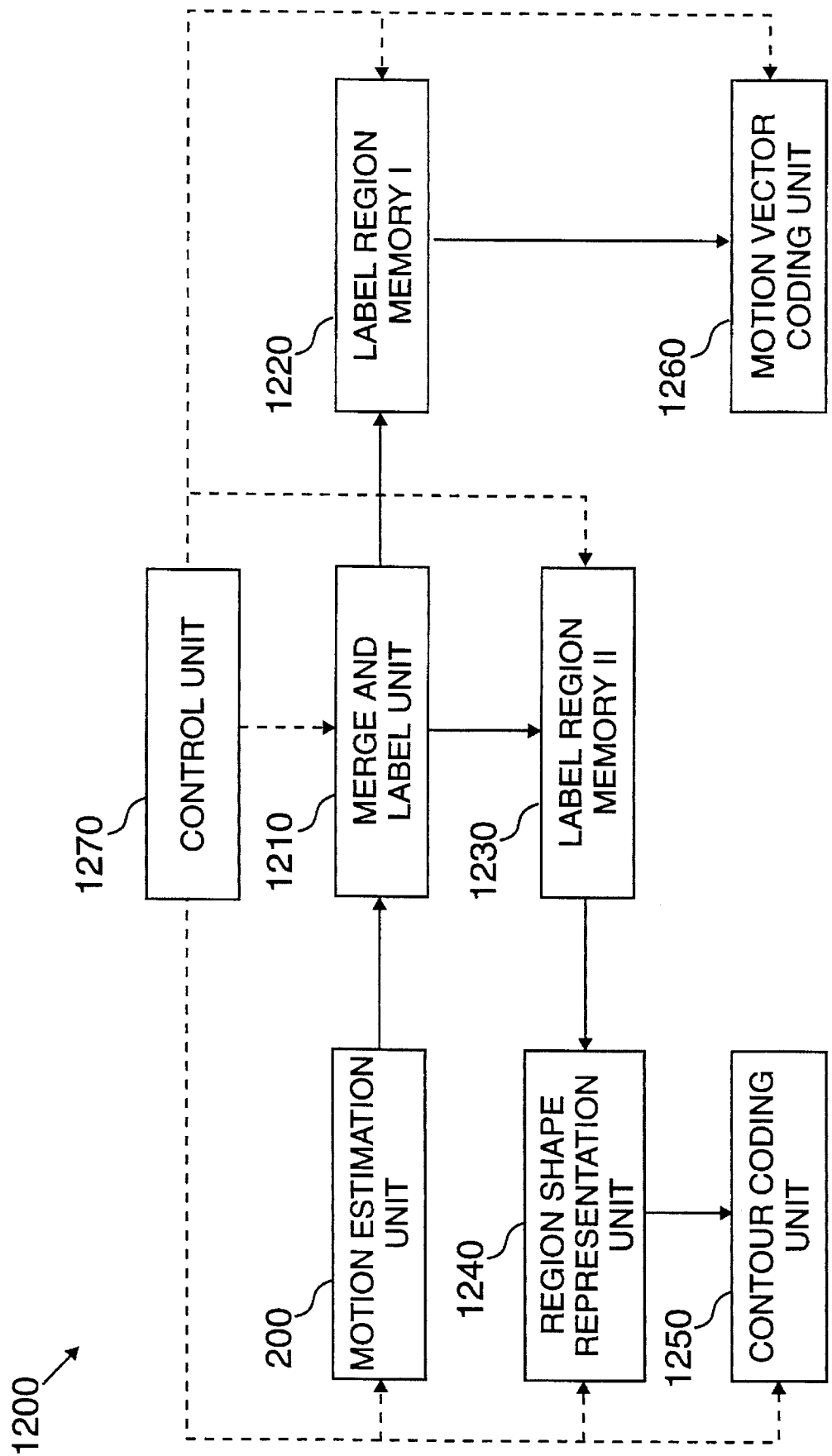
FIG. 12 is a block diagram of a system incorporating motion estimation, segmentation and coding according to the present invention.

FIG. 12 is a block diagram of a system 1200 incorporating motion estimation, segmentation and coding according to the present invention. The system 1200 includes the motion estimation unit 200 which has already been more fully described above. The motion estimation unit 200 is connected to a merge and label unit 1210. The merge and label unit 1210 receives the motion vectors assigned to regions of pixels and stored in the motion field memory 215 of the motion estimation unit 200. The merge and label unit 1210 merges adjacent regions which have similar motion vectors to form merged regions. In a preferred embodiment, the unit 1210 merges adjacent regions which have the same motion vector. The merge and label unit 1210 also assigns to each pixel in the current frame a region label indicating to which merged region it belongs. The merge and label unit 1210 may be, for example, a dedicated logic circuit or a general purpose processor programmed with software to perform the merging and labelling functions.

The merge and label unit 1210 is connected to two read-write memory units. A first region label memory unit 1220 stores the motion vector associated with each merged region. A second region label memory unit 1230 stores the region label assigned to each pixel in the current frame. The first region label memory unit 1220 may be connected to a motion vector coding unit 1260 which converts the motion vectors stored in the memory unit 1220 into binary code for transmission to a receiver (not shown). The motion vector coding unit 1260 may be, for example, a special purpose circuit designed to convert the motion vectors into binary code or a general purpose processor programmed to perform the conversion.

The second region label memory unit 1230 is connected to a region shape representation unit 1240 which performs the region shape representation routine described above. The region shape representation unit 1240 forms a set of contour pixels that uniquely defines the merged regions. The unit 1240 may be implemented by a logic circuit or a general purpose processor programmed to perform the region shape representation routine. The region shape representation unit 1240 is connected to a contour coding unit 1250 which encodes the contour pixels according to the contour coding routine described above. The contour coding unit 1250 may also be, for example, a dedicated circuit or a general purpose processor programmed to perform the contour coding routine.

The system 1200 also has a control unit 1270 which is connected to each of the other components in the system 1200. The control unit 1270 may be, for example, a central processing unit (CPU) or a processing element (PE) which controls the other components in the system 1200 and their interaction. Also, the control unit 1270 and the control unit 290 both may be embodied in the same CPU or the same processing unit. Finally, the contour coding unit 1250 and the motion vector coding unit 1260 may be connected directly or indirectly to the receiver (not shown) so that the encoded contour pixels and the binary coded motion vectors may be transmitted to the receiver for decoding and prediction of the current frame.

The system described above is particularly advantageous in very low bit-rate applications where reducing the amount of side information that must be sent to the decoder is an important factor. Applications that are suitable for transmission of an encoded motion field at very low bit-rates include, for example, audio-visual mobile telecommunication systems, surveillance systems, and certain multimedia systems.

Simulation Results

Simulations were performed comparing the results obtained from the motion estimation, segmentation and coding method of the present invention to that of a full search block matching technique using the syntax of H.261, the international recommendation for video coding. Frames from a sequence of Miss America in QCIF were used in the simulations, and the motion field between every five original frames was calculated. A skip of four frames was chosen because it corresponds to the typical situation used in very low bit-rate applications.

Figure 13:
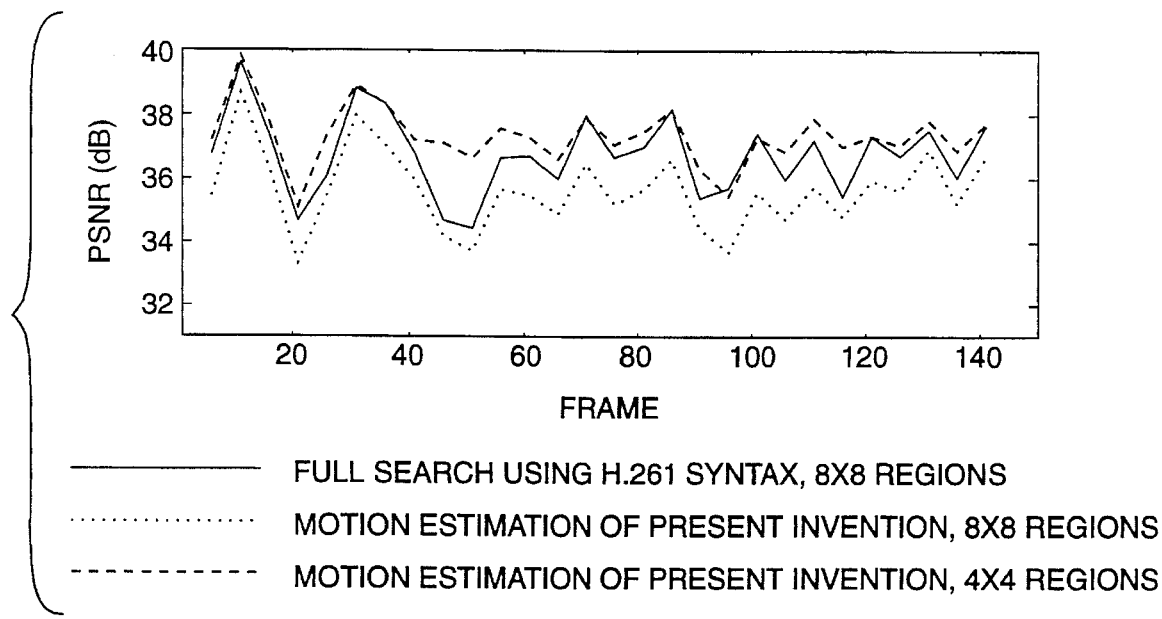
FIG. 13 is a graph indicating the quality of motion field prediction.

FIG. 13 shows graphically the quality of the motion field prediction. The horizontal axis indicates the frame number, and the vertical axis indicates the peak-to-peak signal to noise ratio (PSNR) in units of decibels (dB). The quality of the motion field prediction is shown for three situations. The quality of the motion field prediction obtained by using the H.261 recommendation and blocks of eight by eight pixels is shown by the solid line. The quality of the motion field prediction obtained for two cases using the motion estimation method of the present invention is shown by the dotted and dashed lines, respectively. In the latter two cases, a search range of ±7 pixels was used for the block matching motion estimation technique. In the case represented by the dotted lines, the smallest regions for which the motion vector updating routine was performed had a size of eight by eight pixels. In the case represented by the dashed lines, the smallest regions for which the motion vector updating routine was performed had a size of four by four pixels.

As may be seen from FIG. 13, the quality of prediction improves an average of 0.5 dB when the motion estimation method of the present invention is used with regions having a size of four by four pixels compared to the quality obtained by using the full search technique.

Figure 14:
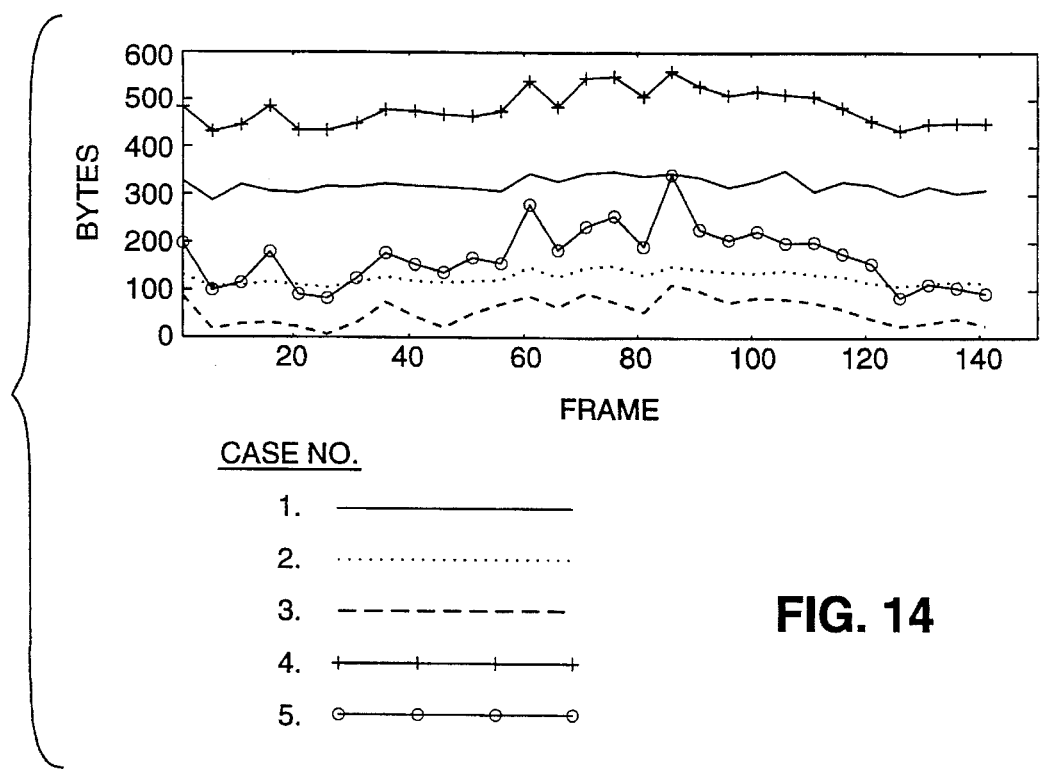
FIG. 14 is a graph indicating the number of bytes per frame required to transmit motion field information.

There may be situations where an improvement in quality over the full search technique is not required. As will become apparent, however, with respect to FIG. 14, the motion estimation method of the present invention provides other advantages over the full search technique even when no improvement in quality is required. FIG. 14 shows graphically the number of bytes per frame that are required to transmit the motion field information. The horizontal axis represents the number of the frame, and the vertical axis represents the number of bytes required. Five cases are represented on the graph in FIG. 14. In the first case, the H.261 syntax was used to perform the full search motion compensation as well as to code the motion vectors of the resulting regions. In the second case, the motion compensation method of the present invention was used with the smallest regions having a size of eight by eight pixels. The motion vector information was coded for transmission, however, using the H.261 syntax. In the third case, the motion estimation method of the present invention again was used with the smallest regions having a size of eight by eight pixels. Also, the motion vector information was coded using the merging step, the region shape representation routine, and the contour coding routine. In the fourth case, the motion estimation method of the present invention was used with the smallest regions having a size of four by four pixels. The motion vector information was coded for transmission using the H.261 syntax. In the fifth case, the motion estimation method of the present invention again was used with the smallest regions having a size of four by four pixels. The motion vector information was coded, however, using the merging step, the region shape representation routine, and the contour coding routine.

It can be seen from FIGS. 13 and 14 that the number of bytes required to transmit the motion vector information can be reduced significantly by using the motion estimation method of the present invention. For example, more than a 50% reduction is achieved in the second case compared to the amount of information that must be sent in the first case. This reduction comes at the expense, however, of an average drop of 1 dB in the quality of prediction as is evident from FIG. 13. Nevertheless, the visual quality obtained by sequentially displaying the predicted frames obtained from the first and second cases is virtually indistinguishable. There is, therefore, a significant advantage to using the motion estimation method of the present invention even where an improvement in the quality of the prediction is not required.

Also, as indicated by the third and fifth cases in FIG. 14, using the preferred method of coding the motion field information results in even greater reductions in the amount of information that must be sent to the receiver. The motion estimation method of the present invention, in conjunction with the preferred coding technique, results in significant improvements over the full search block matching and motion field coding techniques currently in use.

Although specific embodiments of the present invention have been described in detail above, other applications and arrangements within the spirit and scope of the present invention will be readily apparent to persons of ordinary skill in the art. The present invention is, therefore, limited only by the appended claims.

I claim:

1. An improved method of motion field estimation for use in motion compensated frame-to-frame prediction coding comprising the steps of:

dividing a frame having a plurality of pixels into a plurality of smaller regions to form a first segmentation level;

assigning to each of said plurality of smaller regions an initial motion vector;

computing a plurality of matching errors for each smaller region;

determining the value of the smallest matching error among the computed matching errors for each smaller region; and performing for each of said plurality of smaller regions a motion vector updating routine which updates the motion vector of a smaller region by assigning to it a best motion vector selected from among the initial motion vector assigned to the smaller region, a matched motion vector obtained by performing a block matching technique for the smaller region, and motion vectors of the smaller region's neighboring regions, wherein the best motion vector is selected by comparing a predetermined threshold value to the magnitude of the difference between the smallest matching error and at least one matching error corresponding to said initial motion vector, said matched motion vector, or one of the motion vectors of said neighboring regions.

2. The method of claim 1 wherein the motion vector routine includes the steps of:

determining the smallest matching error from among the matching errors obtained respectively by assigning to the smaller region the following motion vectors:

(a) the initial motion vector assigned to the smaller region;

(b) the matched motion vector obtained by performing a block matching technique for the smaller region; and (c) the motion vectors of the smaller region's neighboring regions;

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:

(a) the absolute value of the difference between the smallest matching error and the matching error obtained by using the initial motion vector is not less than the predetermined threshold value; and (b) the absolute value of the difference between the smallest matching error and the matching error obtained by assigning to the smaller region the motion vector of the neighboring region is less than the predetermined threshold value; and selecting the matched motion vector as the best motion vector if:

(a) the absolute value of the difference between the smallest matching error and the matching error obtained by using the initial motion vector is not less than the predetermined threshold value; and (b) the absolute value of the difference between the smallest matching error and each of the matching errors obtained by assigning to the smaller region the motion vector of one of the neighboring region is not less than the predetermined threshold value.

3. The method of claim 2 wherein the initial motion vector assigned to each smaller region in the first segmentation level has the value zero.

4. The method of claim 3 further including the steps of:

(a) dividing each smaller region in the previous segmentation level into a plurality of smaller regions of predetermined shape and size to form a subsequent segmentation level;

(b) assigning to each of the plurality of smaller regions in the subsequent segmentation level an initial motion vector equal to the motion vector of its parent region; and (c) performing the motion vector updating routine for each of said plurality of smaller regions in the subsequent segmentation level.

5. The method of claim 4 further comprising the step of repeatedly performing the steps (a), (b) and (c) specified in claim 4 until a stop condition is reached.

6. The method of claim 5 wherein the shape of each smaller region is rectangular.

7. The method of claim 6 wherein the size of the smaller regions is the same for each smaller region in a particular segmentation level.

8. The method of claim 7 wherein the stop condition is a lower bound on the size of the smaller regions.

9. The method of claim 7 wherein the stop condition is a predetermined value of a total matching error for the frame.

10. The method of claim 7 wherein the stop condition is a predetermined number of segmentation levels with respect to which the motion vector updating routine is performed.

11. The method of claim 7 further comprising the steps of:

merging adjacent regions having similar motion vectors;

assigning a region label to each of said plurality of pixels;

performing a region shape representation routine for each of said plurality of pixels to define a plurality of contour pixels; and performing a contour coding routine to encode each of said plurality of contour pixels.

12. The method of claim 11 wherein the region shape representation routine comprises the steps of:

comparing the region label of the pixel to the region labels of a specified group of three neighboring pixels; and labelling the pixel as a contour pixel if its region label differs from at least one of the region labels of the specified group of three neighboring pixels.

13. The method of claim 12 wherein the contour coding routine uses a chain coding technique.

14. The method of claim 13 wherein the contour coding routine comprises the steps of:

(a) storing coordinates of an initial contour pixel;

(b) removing the initial contour from consideration in subsequent steps of the contour coding routine if it has fewer than two remaining adjacent contour pixels;

(c) storing a direction in which a segment of adjacent contour pixels continues;

(d) storing the length of said segment;

(e) removing from consideration in subsequent steps of the contour coding routine those contour pixels that have been encoded and that have fewer than three remaining adjacent contour pixels;

(f) repeating the steps of storing a direction, storing the length, and removing contour pixels from consideration until there are no more contour pixels which are adjacent to the most recently encoded pixel and which have not been removed from consideration;

(g) storing information to indicate the end of a contour; and (h) repeating the above steps (a) through (g) until each of the plurality of contour pixels is encoded.

15. In a method of motion compensated frame-to-frame prediction coding, wherein a displacement vector is transmitted to a video receiver decoder for each region of a current frame, an improvement for selecting the displacement vector corresponding to a group of pixels in the current frame, where said group of pixels was segmented from a larger region having a motion vector, said improvement comprising the steps of:

assigning to said group of pixels an initial motion vector equal to the motion vector of the larger region;

computing a matching error obtained by assigning the initial vector to said group of pixels;

performing a block matching motion estimation technique with respect to the group of pixels to provide a matched motion vector;

computing a matching error obtained by assigning the matched motion vector to the group of pixels;

computing matching errors obtained by assigning motion vectors of neighboring regions to the group of pixels;

determining the smallest matching error from among said computed matching error and said computed matching errors; and assigning to the group of pixels a best motion vector selected from among the initial motion vector, the motion vectors of the neighboring regions, and the matched motion vector, where the best motion vector is selected by comparing a predetermined threshold value to the magnitude of the difference between the smallest matching error and at least one matching error corresponding to said initial motion vector, said matched motion vector, or one of the motion vectors of said neighboring regions.

16. The method of claim 15 wherein the step of assigning a best motion vector further includes the steps of:

determining the smallest matching error from among the computed matching errors;

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:

(a) the absolute value of the difference between the smallest matching error and the matching error obtained by using the initial motion vector is not less than the predetermined threshold value; and (b) the absolute value of the difference between the smallest matching error and the matching error obtained by assigning to the group of pixels the motion vector of the neighboring region is less than the predetermined threshold value; and selecting the matched motion vector as the best motion vector if:

(a) the absolute value of the difference between the smallest matching error and the matching error obtained by using the initial motion vector is not less than the predetermined threshold value; and (b) the absolute value of the difference between the smallest matching error and each of the matching errors obtained by assigning to the group of pixels the motion vector of one of the neighboring region is not less than the predetermined threshold value.

17. An apparatus for use in improved motion field estimation of a video image, said apparatus comprising:

a previous decoded frame memory unit for storing a monochrome intensity for each pixel in a preceding frame;

a current frame memory unit for storing a monochrome intensity for each pixel in a current frame;

a motion field memory unit for storing a motion vector for each pixel in the current frame;

a motion refinement unit for performing a block matching technique for a block of pixels in the current frame and for providing a matched motion vector;

a candidate motion vector memory unit for storing motion vectors which are candidates for updating the motion vector of said block of pixels, wherein the candidate motion vector memory unit is connected to said motion field memory unit for receiving and storing an initial motion vector assigned to said block of pixels and motion vectors of regions neighboring said block of pixels, and wherein the candidate motion vector memory unit is further connected to said motion refinement unit for receiving and storing the matched motion vector;

a matching error computing unit for computing matching errors obtained by assigning to said block of pixels the motion vectors stored in the candidate motion vector memory unit;

a matching error memory unit for storing the matching errors computed by said matching error computing unit;

a minimum detector unit for determining the value of the smallest matching error among the matching errors stored in the matching error memory unit;

a best motion vector selection unit, connected to the motion field memory unit, for determining a best motion vector for refining the motion vector of the block of pixels, wherein the best motion vector is selected from among the motion vectors stored in the candidate motion vector memory unit, and wherein the best motion vector is selected by comparing a predetermined threshold value to the magnitude of the difference between the smallest matching error and at least one of the matching errors stored in the matching error memory unit; and a control unit for controlling the other units and their interaction, wherein the control unit is connected to each of the other units in the apparatus.

18. The apparatus of claim 17 wherein the best motion vector selection unit performs the following functions:

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:

(a) the absolute value of the difference between the smallest matching error and the matching error obtained by using the initial motion vector is not less than the predetermined threshold value; and (b) the absolute value of the difference between the smallest matching error and the matching error obtained by assigning to the smaller region the motion vector of the neighboring region is less than the predetermined threshold value; and selecting the matched motion vector as the best motion vector if:

(a) the absolute value of the difference between the smallest matching error and the matching error obtained by using the initial motion vector is not less than the predetermined threshold value; and (b) the absolute value of the difference between the smallest matching error and each of the matching errors obtained by assigning to the smaller region the motion vector of one of the neighboring region is not less than the predetermined threshold value.

19. A system for performing motion field estimation and coding of a video image, said system comprising:

a motion estimation unit for refining a motion vector assigned to a block of pixels in a current frame by assigning to the block of pixels a best motion vector selected from among a plurality of candidate motion vectors, wherein said plurality of candidate motion vectors includes an initial motion vector assigned to said block of pixels, a matched motion vector obtained by performing a block matching technique for said block of pixels, and motion vectors of regions neighboring said block of pixels, said motion estimation unit further computing a smallest matching error from among the plurality of candidate vectors and wherein the best motion vector is selected by comparing a predetermined threshold value to the magnitude of the difference between the smallest matching error and at least one matching error corresponding to said initial motion vector, said matched motion vector, or one of the motion vectors of said neighboring regions;

a merge and label unit for merging adjacent regions of the current frame that have similar motion vectors to form merged regions and for assigning to each pixel in the current frame a region label;

a first region label memory unit for storing a motion vector associated with each merged region;

a second region label memory unit for storing the region label assigned to each pixel in the current frame;

a region shape representation unit for forming a set of contour pixels that defines the merged regions;

a contour coding unit for encoding the set of contour pixels; and a control unit for controlling the other units and their interaction, wherein the control unit is connected to each of the other units in the system.

20. The system of claim 19 wherein the motion estimation unit comprises:

a previous decoded frame memory unit for storing a monochrome intensity for each pixel in a preceding frame;

a current frame memory unit for storing a monochrome intensity for each pixel in a current frame;

a motion field memory unit for storing a motion vector for each pixel in the current frame;

a motion refinement unit for performing a block matching technique for a block of pixels in the current frame and for providing a matched motion vector;

a candidate motion vector memory unit for storing motion vectors which are candidates for updating the motion vector of said block of pixels wherein the candidate motion vector memory unit is connected to said motion field memory unit for receiving and storing an initial motion vector assigned to said block of pixels and motion vectors of regions neighboring said block of pixels, and wherein the candidate motion vector memory unit is further connected to said motion refinement unit for receiving and storing the matched motion vector;

a matching error computing unit for computing matching errors obtained by assigning to said block of pixels the motion vectors stored in the candidate motion vector memory unit;

a matching error memory unit for storing the matching errors computed by said matching error computing unit;

a minimum detector unit for determining the value of the smallest matching error among the matching errors stored in the matching error memory unit; and a best motion vector selection unit, connected to the motion field memory unit, for determining, according to a priority scheme and a predetermined threshold value, a best motion vector for refining the motion vector of the block of pixels, and wherein the best motion vector is selected from among the motion vectors stored in the candidate motion vector memory unit.

21. The system of claim 20 wherein the best motion vector selection unit performs the following functions:

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:

(a) the absolute value of the difference between the smallest matching error and the matching error obtained by using the initial motion vector is not less than the predetermined threshold value; and (b) the absolute value of the difference between the smallest matching error and the matching error obtained by assigning to the smaller region the motion vector of the neighboring region is less than the predetermined threshold value; and selecting the matched motion vector as the best motion vector if:

(a) the absolute value of the difference between the smallest matching error and the matching error obtained by using the initial motion vector is not less than the predetermined threshold value; and (b) the absolute value of the difference between the smallest matching error and each of the matching errors obtained by assigning to the smaller region the motion vector of one of the neighboring region is not less than the predetermined threshold value.

22. The system of claim 21 wherein the region shape representation unit performs the following functions:

comparing the region label of a pixel to the region labels of a specified group of three neighboring pixels; and labelling the pixel as a contour pixel if its region label differs from at least one of the region labels of the specified group of three neighboring pixels.

23. The system of claim 22 wherein the contour coding unit implements a chain coding technique.

24. The system of claim 23 wherein the contour coding unit performs the following steps:

(a) storing coordinates of an initial contour pixel;

(b) removing the initial contour from consideration in subsequent steps of the contour coding routine if it has fewer than two remaining adjacent contour pixels;

(c) storing a direction in which a segment of adjacent contour pixels continues;

(d) storing the length of said segment;

(e) removing from consideration in subsequent steps of the contour coding routine those contour pixels that have been encoded and that have fewer than three remaining adjacent contour pixels;

(f) repeating the steps of storing a direction, storing the length, and removing contour pixels from consideration until there are no more contour pixels which are adjacent to the most recently encoded pixel and which have not been removed from consideration;

(g) storing information to indicate the end of a contour; and (h) repeating the above steps (a) through (g) until each of the plurality of contour pixels is encoded.

* * * * *